United States Patent [19]

Tani

[11] Patent Number: 5,504,841
[45] Date of Patent: Apr. 2, 1996

[54] METHOD OF PROCESSING SIGNALS WITHIN A NEURAL NETWORK TO POSITION AROBOT

[75] Inventor: Jun Tani, Kanagawa, Japan

[73] Assignee: Sony Corporation, Japan

[21] Appl. No.: 154,995

[22] Filed: Nov. 19, 1993

Related U.S. Application Data

[63] Continuation of Ser. No. 787,800, Nov. 4, 1991, abandoned.

[30] Foreign Application Priority Data

| | | | |
|---|---|---|---|
| Nov. 6, 1990 | [JP] | Japan | 2-298984 |
| Dec. 27, 1990 | [JP] | Japan | 2-414907 |
| May 25, 1991 | [JP] | Japan | 3-149688 |

[51] Int. Cl.$^6$ ............................. G06F 15/18; G06F 15/20
[52] U.S. Cl. .................. 395/81; 395/80; 395/84; 395/903
[58] Field of Search .................. 395/11, 22, 24, 395/27, 81–89, 94, 904; 382/1, 12–15; 901/14–19

[56] References Cited

U.S. PATENT DOCUMENTS

| | | | |
|---|---|---|---|
| 4,660,166 | 4/1987 | Hopfield | 395/24 |
| 4,752,906 | 6/1988 | Kleinfeld | 395/24 |
| 4,852,018 | 7/1989 | Grossberg et al. | 395/94 |
| 4,990,838 | 2/1991 | Kawato et al. | 395/11 |
| 5,155,802 | 10/1992 | Mueller et al. | 395/11 |
| 5,167,006 | 11/1992 | Furuta et al. | 395/27 |
| 5,172,253 | 12/1992 | Lynne | 395/22 |
| 5,323,470 | 6/1994 | Kara et al. | 382/1 |

FOREIGN PATENT DOCUMENTS

0377467  11/1990  European Pat. Off. ........ G06F 15/80

OTHER PUBLICATIONS

"Parallel Distributed Networks for Image Smoothing and Segmentation in Analog VLSI"–Lumsdaine et al., 1989 IEEE –pp. 272–278.

Alex W. Ho and Geoffrey C. Fox; "Neural Network Near–Optimal Motion Planning for a Mobile Robot on Binary and Varied Terrains"; IEEE IROS '90; p. 593–600.
Bartlett W. Mel; "Further Explorations in Visually–Guided Reaching: Making Murphy Smarter"; IEEE Conf. on Neural Information Processing Systems; 1988; pp. 348–356.
David H. Ackley; "Associative Learning Via Inhibitory Search"; IEEE Conf. on Neural Information Processing Systems; 1988; pp. 21–28.
C. Kozakiewicz and M. Ejiri; "Neural Network Approach to Path Planning for Two Dimensional Robot Motion", IROS '91, Nov. 3–5, 1991; pp. 818–823.
C. H. Chung and K. S. Lee; "Neural Network Application to the Obstacle Avoidance Path Planning for CIN"; IROS '91, 3–5 Nov. 1991; pp. 824–828.

(List continued on next page.)

*Primary Examiner*—David K. Moore
*Assistant Examiner*—Tariq Rafiq Hafiz
*Attorney, Agent, or Firm*—Limbach & Limbach; Charles P. Sammut

[57] ABSTRACT

A signal processing method for efficiently searching an optimum solution in a neural network by including a term of a nonlinear resistance in an equation of motion and changing such nonlinear resistance periodically. According to the method, the range of absolute values of connection weights between units in the neural network is limited by the equation of motion, hence preventing a prolonged search time that may otherwise be caused by excessive extension of the search scope beyond the requisite. A plurality of patterns are previously embedded or stored in the neural network and, upon input of a predetermined key pattern, the nonlinear resistance is changed periodically to recall a pattern similar to the key pattern, whereby any desired pattern can be searched or retrieved with rapidity and facility out of the complicated patterns. A process of calculating the next position of an articulated robot corresponding to an optimum solution is repeated while periodically changing a nonlinear resistance included in another equation of the positional energy of the robot, thereby acquiring the data of the robot path up to a desired goal.

4 Claims, 19 Drawing Sheets

OTHER PUBLICATIONS

C. H. Chung and K. S. Lee; "Hopfield Network Application to Optimal Edge Selection"; IEEE Joint Conf. on Neural Networks; 18–21 Nov. 1991; pp. 1542–1547.

U.S. Ser. No. 08/007,589, Filing Date Jan. 22, 19934, Issued to Tani.

Proceedings of the 1990 American Control Conference, San Diego, CA, USA 23–25 May 1990 pp. 2997–3000 XP170163 M. S. Fadali et al. 'Minimum–time Control of Robotic Manipulators Using a Back Propagation Neural Network'–pp. 2997–3000.

Biological Cybernetics vol. 62, No. 4, Feb. 1990, Berlin, DE pp. 275–288 XP123325 M. Kawato et al. 'Trajectory Formation of Arm Movement by Cascade Neural Network Model Based on Minimum Torque–change Criterion'–pp. 275–288.

INNC 90 Paris, International Neural Network Conference, Paris, FR, 9–13 Jul. 1990 pp. 229–236 XP145275 C. R. Paraten et al. 'Neurocontrol applied to Telerobotics for the Space Shuttle'–pp. 229–236.

Neural Computation, Winter 1989, USA pp. 511–521 Tsurukis A. G. et al. 'Non Linear Optimization using Generalized Hopfield Networks'–pp. 511–524.

Neural Network Near–Optimal Motion Planning for a Mobile Robot on Binary and Varied Terrains, Alex W. Ho and Geoffrey C. Fox, IEEE IROS '90, pp. 593≧600.

Further Explorations in Visually–Guided Reaching: Making Murphy Smarter, Bartlett W. Mel IEEE Conf. on Neural Information Processing Systems, 1988, pp. 348–355.

Associative Learing Via Inhibitory Search, David H. Ackley, IEEE Conf on Neural Information Processing Systems, 1988, pp. 21–28.

Neural Network Approach to Path Planning for Two Dimensional Robot Motion, C. Kozakiewicz and M. Ejri, IEEE IROS '91, pp. 818–823.

Neural Network Application To The Obstacle Avoidance Path Planning for CIM (Computer Integrated Manufacturing), C. H. Chung and K. S. Lee, IEEE IROS '91, pp. 824–828.

Hopfield Network Application to Optimal Edge Selection, C. H. Chung and K. S. Lee, IEEE Joint Conf. on Neural Networks, Nov. 18–21, 1991, pp. 1542–1547.

Jun Tani, *Proposal of Chaotic Steepest Descent Method for Neural Networks and Analysis of Their Dynamics*, Electronics and Communications in Japan, Part 3, vol. 75, No. 4, 1992 (Translated from Denshi Joho Tsushin Gakki Ronbubshi, vol. 74–A, No. 8, Aug. 1991, pp. 1208–1215).

Jun Tani, *Proposal of Chaotic Steepest Descent Method for Neural Networks and Analysis of Their Dynamics*, Denshi Joho Tsushin Gakki Ronbubshi, vol. 74–A, No. 8, Aug. 1991, pp. 1208–1215.

m:0.95, d0:1.0, d1:-0.3, d2:0.2, ω:0.3

PHASE : 17/24 π

(PHASE = $1/24\pi$)

(PHASE = $5/24\pi$)

(PHASE = $7/24\pi$)

(PHASE = 11/24 π)

(PHASE = 15/24 π)

(PHASE = 23/24 π)

F I G. 10g
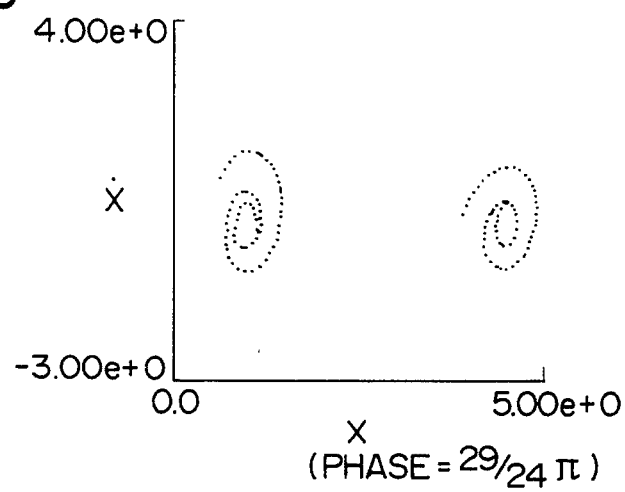
(PHASE = 29/24 π)
F I G. 10h
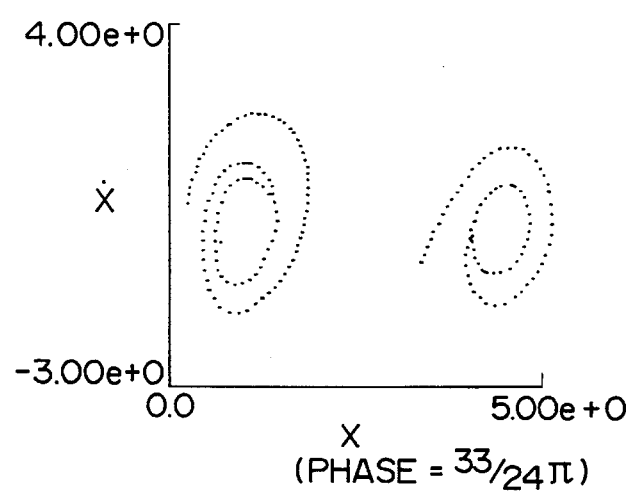
(PHASE = 33/24 π)
F I G. 10i
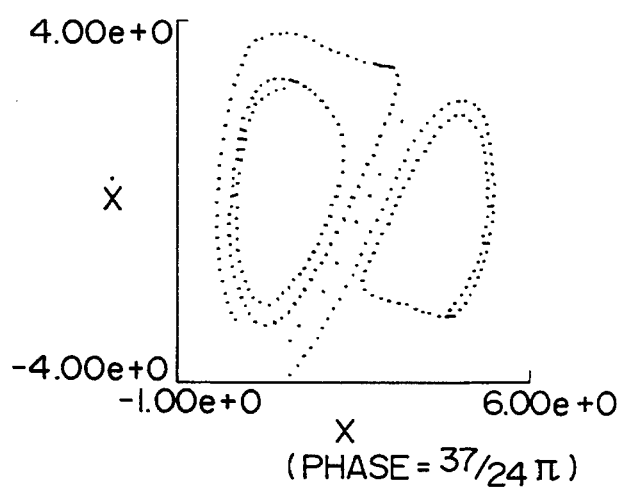
(PHASE = 37/24 π)

(PHASE = 39/24 π)

(PHASE = 41/24 π)

(PHASE = 43/24 π)

d₂ = 10.2 d₂ = 10.3 d₂ = 8.5 d₂ = 10.5  1 PERIOD d₂ = 9.0

SPACE OF ROBOT ARM

CHAOTIC SEARCH PROCESS IN ENERGY FIELD IN ROTATION ANGLE SYSTEM

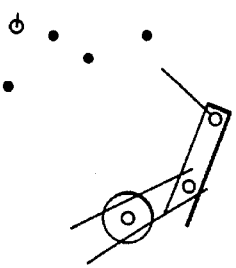
FIG. 22d
t = 1800
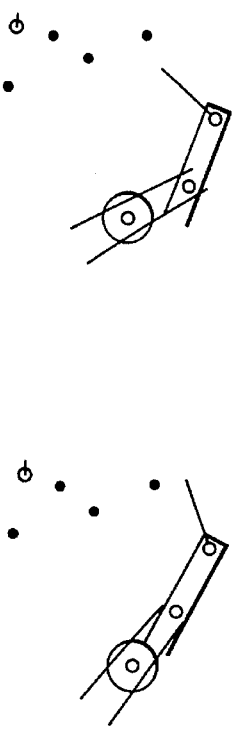
FIG. 22c
t = 1400
FIG. 22b
t = 700
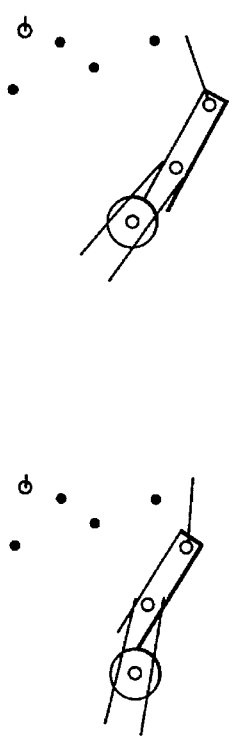
FIG. 22a
t = 0
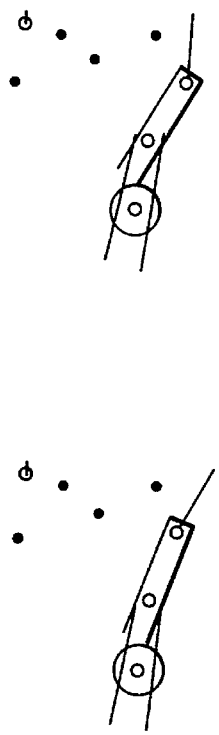
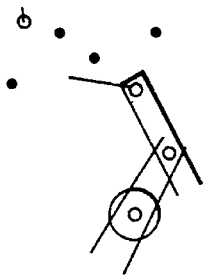
FIG. 22h
t = 2300
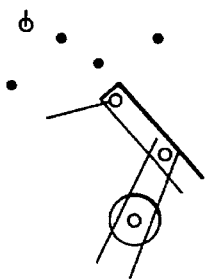
FIG. 22g
t = 2200
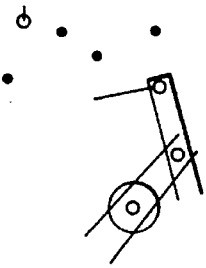
FIG. 22f
t = 2000
FIG. 22e
t = 1900
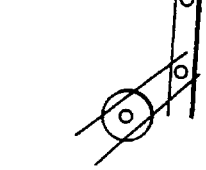

t = 3300 t = 3100 t = 2800 t = 2500 t = 4400

METHOD OF PROCESSING SIGNALS WITHIN A NEURAL NETWORK TO POSITION AROBOT

This is a continuation of application Ser. No. 07/787,800 filed on Nov. 4, 1991, now abandoned.

BACKGROUND OF THE INVENTION

1. Field of the Invention

The present invention relates to a signal processing method adapted to search an optimum solution in a neural network which is applicable to problems in processing a variety of intelligent information.

2. Description of the Prior Art

It is noted of late that various attempts are in rapid progress with regard to a contrivance of incorporating the biological information processing mechanism of life into an engineering information processing system. The studies of neural networks have been developed with such background, and some models thereof are currently spreading among the general engineering, inclusive of a learning algorithm of error back propagation, Hopfield neural network and so forth. Examining such neural network models from the dynamic point of view, it is understood that they are based on the premise of the Liapunov stability in common. More specifically, the process of learning or memory recall is defined as dynamics of asymptotic convergence from an adequate initial value on a given energy phase toward an equilibrium point attractor. The equilibrium point attained through such process is a relative minimum solution of the energy and may not exactly be a desired minimum or optimum solution to be obtained, thereby raising a problem of local minimum. It is ideal to achieve a stable descent along the energy gradient while averting the local minimum solution successfully, but such is not realizable in any model dominated by the Liapunov stability.

Describing the above in further detail, it has been customary heretofore to employ a steepest descent method when searching a minimum solution in the presence of some local minimum solution. According to such known steepest descent method, in a case where a minimizing evaluation function E is given by $$E=(x_1, x_2 \ldots x_n)$$

partial differential values to a variable x in the local points of the evaluation function E are calculated as follows:

$$\dot{x}_1 = -\epsilon (\partial E/\partial x_1)$$
$$\dot{x}_2 = -\epsilon (\partial E/\partial x_2)$$
$$\vdots$$
$$\dot{x}_n = -\epsilon (\partial E/\partial x_n)$$

where $\epsilon$ is a positive constant.

Temporally solving the above evolutional equations numerically with respect to the variable x, the minimum solution can be obtained by utilizing the Liapunov stability that the variable x is at the minimum solution when the partial differential value $\dot{x}$ has reached zero (i.e., when the change of the partial differential value $\dot{x}$ has become none).

However, a desired solution to be finally obtained is the minimum (optimum) solution as shown in FIG. 24, and the local minimum solution is not exactly coincident with the minimum solution, so that a restriction is existent in calculating the minimum solution (optimum solution) by the steepest descent method.

Therefore a new dynamic premise may be contrived to render the minimum absorption structure unstable by partially altering the premise of the Liapunov stability.

Reexamining the neural net dynamics from the viewpoint mentioned above, a chaotic dynamic system is considered to replace the dynamic system of the Liapunov stability. The path realized by the chaotic dynamic system has some unpredictable instability while being led to an attractor, so that both stability and instability are coexistent in the dynamics. In case such chaotic characteristic is introduced into a neural network, it is expectable to furnish the network model with enhanced flexibility. With regard to applications of the chaotic dynamics to neural networks, noticeable results have been attained heretofore due to the advanced studies based particularly on the biological researches.

In "Pattern Dynamics of Chaotic Neural Network" (Shingaku Giho, NC89-8, 43 (1989)), there is proposed a mathematic model of a chaotic neural network accomplished on the basis of the analytic result relative to the nonlinear response characteristic observed in the large axon of a squid. Also in "Memory Dynamics in Asynchronous Neural Networks" (Prog. Theor. Phys. 78 (1987) 51) and "Information Processing of Brain and Chaos" (Computer Today, 23 (1989) No. 32), a network model is constructed for realizing chaotic memory search with disclosure of a role in the chaotic information processing by an elucidatory approach of brain based on observation of the column structure of the cerebral cortex of a sea bream.

However, any of the above conventional methods has some difficulties in efficiently obtaining the minimum solution (optimum solution) out of a plurality of local minimum solutions.

OBJECT AND SUMMARY OF THE INVENTION

The present invention has been accomplished in view of the circumstances mentioned. And an object of the invention is to provide an improved signal processing method which is capable of achieving efficient search of an optimum solution in a neural network.

According to a first aspect of the present invention, there is provided a signal processing method for searching an optimum solution in a neural network, where a term of a nonlinear resistance is included in an equation of motion, and such nonlinear resistance is changed periodically so that the optimum value (minimum value) can be searched efficiently without being concerned with any of local minimum values.

According to a second aspect of the present invention, there is provided a signal processing method where a term of a nonlinear resistance in an equation of motion is expressed as $$f(\dot{x}, \omega t)=[d_0 \sin (\omega t)+d_1]\dot{x}+ d_2\dot{x}^2 \operatorname{sgn} (\dot{x});$$

Since the term of the nonlinear resistance comprises a term to act on the speed linearly and a term to act on the speed direction at the square of the speed, no periodicity is induced in the state transition between the local minimum values to consequently ensure a precise search of the optimum value.

According to a third aspect of the invention, there is provided a signal processing method where the range of absolute values of connection weights between units is limited by the equation of motion. Therefore it becomes possible to prevent a prolonged search time that may otherwise be caused by excessive extension of the search scope beyond the requisite.

According to a fourth aspect of the invention, there is provided a signal processing method adapted for a neural network of Hopfield model, wherein a plurality of patterns are previously embedded or stored in the neural network and, upon input of a predetermined key pattern, a nonlinear resistance included in an equation of motion is changed periodically to recall the pattern similar to the key pattern. Therefore a desired pattern can be searched or retrieved with rapidity and facility out of the complicated patterns.

According to a fifth aspect of the invention, there is provided a signal processing method where a term of a nonlinear resistance is included in an equation of the positional energy of a robot, and a process of calculating the next robot position of an optimum solution is repeated by periodically changing the nonlinear resistance, hence acquiring the data of the robot path up to a desired goal, Thus, it becomes possible to avoid any obstacle with certainty, According to a sixth aspect of the invention, there is provided a signal processing method where the robot is of an articulated type, Consequently the method is rendered applicable to a further variety of robots in multiple uses.

The above and other features and advantages of the present invention will become apparent from the following description which will be given with reference to the illustrative accompanying drawings.

BRIEF DESCRIPTION OF THE DRAWINGS

FIGS. 10a to 10l are Poincare sectional views in individual phases of a periodically changing nonlinear resistance;

FIGS. 22a to 22h illustrate how a manipulator of a robot reaches a desired goal while avoiding any of obstacles;

DESCRIPTION OF THE PREFERRED EMBODIMENT

Hereinafter the signal processing method of the present invention will be described in detail with reference to a preferred embodiment thereof shown in the accompanying drawings.

First a description will be given on a dynamic model of the present invention and a technique employed therein. Then the characteristic of such dynamic model in a simple system will be evaluated on the basis of calculational experiments. Thereafter a description will be given on a learning algorithm of error back propagation in a multilayered network and also on the result of applying such model to memory recall in a Hopfield network model. And finally an exemplary embodiment applied to an articulated robot will be explained.

(1) Chaotic steepest descent method

In many of neural network models, a minimum (optimum) solution of an energy function is calculated numerically by a steepest descent method. In such steepest descent method, it is ensured that, as expressed by Eq. (1), the direction of change of a variable x is coincident with the direction of an energy gradient at the relevant point and also that a temporal evolution of Eq. (2) obtained by rewriting Eq. (1) to a continum is converged to a minimum. Eq. (2) represents the Liapunov stability.

$$\Delta x = -\epsilon \nabla E(x) \tag{1}$$

where $\epsilon$ is a positive constant, and $E(x)$ is an energy function.

$$\dot{x} = -e \nabla E(x) \tag{2}$$

where $\nabla E(x)$ signifies $\partial E/\partial x$.

Eq. (3) of motion obtained by including a quadratic differential into Eq. (2) and introducing an inertia term (first term) and a divergence term (second term) also into Eq. (2) represents a dynamic characteristic that any small local minimum is skipped over by an inertial force. A final point of arrival is definitely one of local minimum solutions as graphically shown in FIG. 2, but it is not ensured that convergence to a minimum solution is attained without fail.

$$m\ddot{x}+d\dot{x}=-\epsilon\nabla E(x) \quad (3)$$

where m stands for a mass (m>0), and d for a resistance (d>0).

Therefore, as expressed in Eq. (4), a means is contrived to alter the structure of the asymptotic convergence to a minimum by introducing an adequate nonlinear resistance into the divergence term (second term) on the left side of Eq. (3).

$$m\ddot{x}+f(\dot{x})=-\epsilon\nabla E(x) \quad (4)$$

where $f(\dot{x})$ denotes a nonlinear resistance function.

Figure 3:
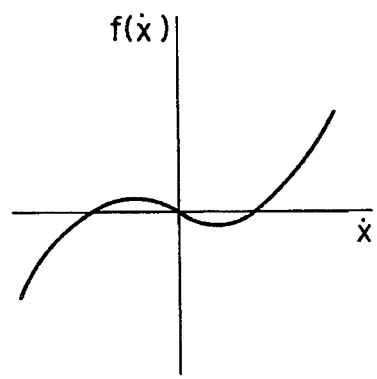
FIG. 3 graphically shows positive and negative characteristics of the nonlinear resistance.
Figure 4:
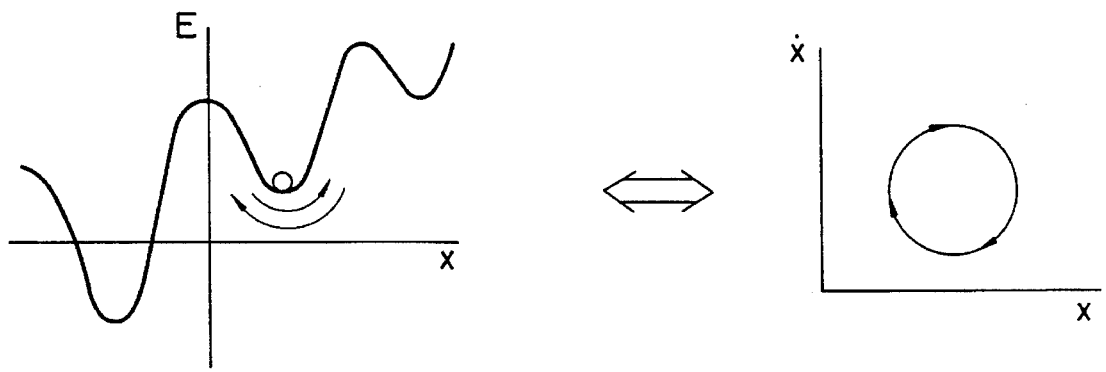
FIG. 4 graphically shows the relationship between an energy function and a limit cycle.

FIG. 3 graphically shows an exemplary case of introducing a nonlinear resistance which serves as a negative resistance at a low speed or as a positive resistance at a high speed. In this case, Eq. (4) does not represent the Liapunov stability any longer. However, as shown in FIG. 4, the path obtained is stably converged to a limit cycle where, in a steady state, the minimum is at the center, and there is no alteration with respect to the composition that the path is led into the minimum basin.

For the purpose of unstabilizing the path obtained from Eq. (4), an attempt is made to periodically change the nonlinear resistance characteristic as expressed in Eq. (5) shown below.

$$m\ddot{x}+f(\dot{x}, \omega t)=-\epsilon\nabla E(x) \quad (5)$$

where $f(\dot{x}, \omega t)$ denotes a periodic nonlinear resistance function.

Figure 1:
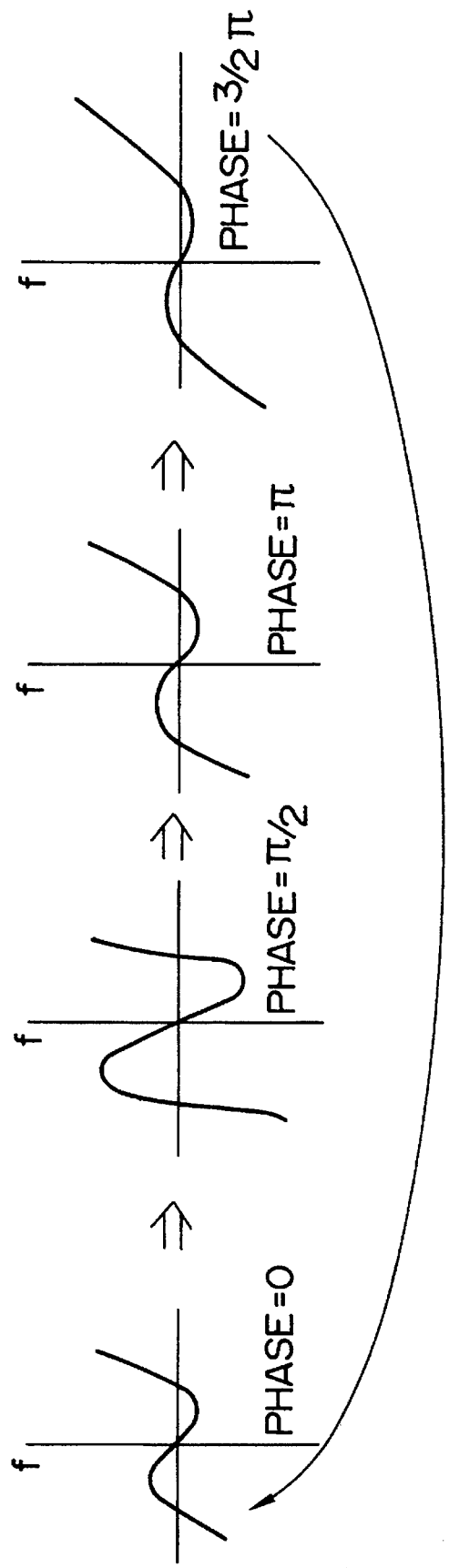
FIG. 1 illustrates changes caused in a nonlinear resistance used in the signal processing method of the present invention.

In order to transit the limit cycle sequentially to other local minimum solutions, the limit cycle is unstabilized periodically. For this purpose, the negative portion of the nonlinear resistance is periodically changed to be greater or smaller as shown in FIG. 1.

When the positive or negative resistance value is changed with a relatively slow period ($\omega$), the path is rendered stable in the phase of increasing the positive resistance and asymptotically approaches the minimum solution, whereas the path is rendered unstable in the phase of increasing the negative resistance and is urged to deviate from the minimum solution. It is therefore presumed that, in a proper procedure of changing the resistance, the path is caused to travel chaotically from one local minimum solution to another.

Figure 5:
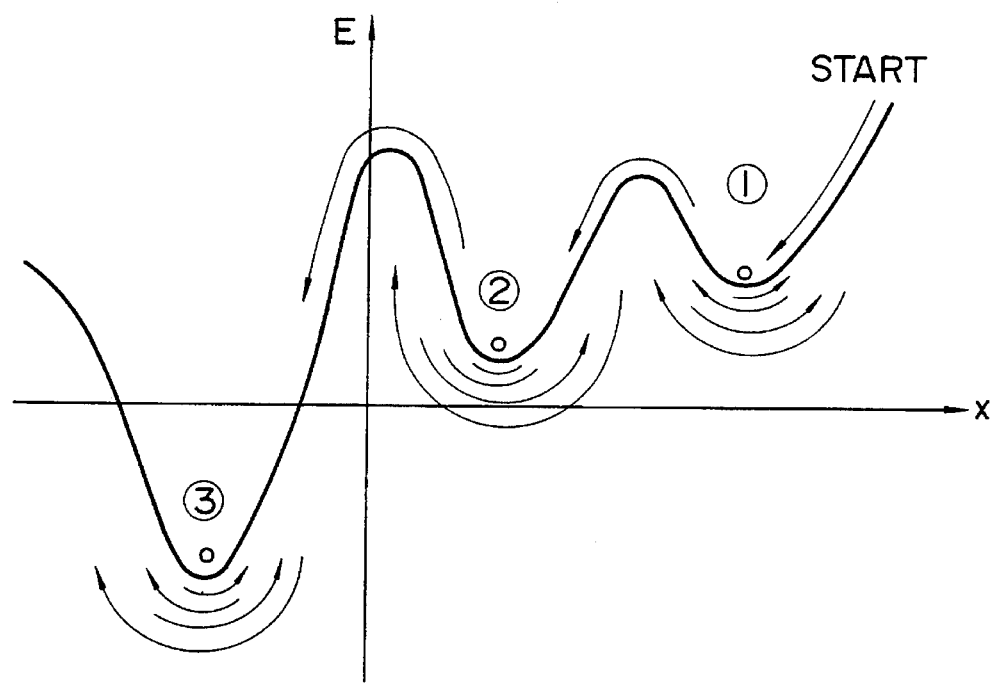
FIG. 5 graphically shows an energy function characteristic for explaining a search of a local minimum solution.
Figure 6:
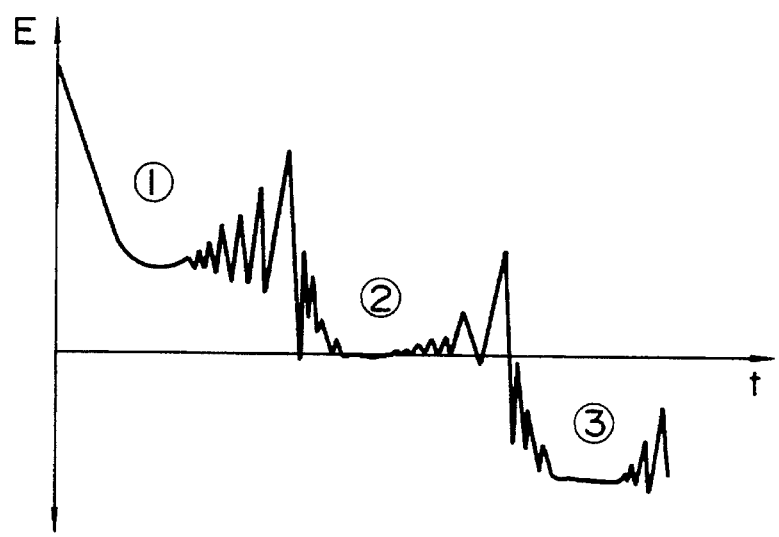
FIG. 6 graphically shows the aspect of transition to local minimums in the characteristic diagram of FIG. 5.

More specifically, if a periodically changing nonlinear-resistance is introduced, the temporal evolution of the equation is such that, as graphically shown in FIG. 5, the path comes to sequentially skip over, for example, two local minimum solutions 1 and 2 enclosed with circles in the diagram.

A method of numerically searching a minimum solution of energy in accordance with the dynamic model represented by Eq. (5) of motion is called a chaotic steepest descent method (hereinafter referred to as CSD method).

(2) Calculational experiment in one-dimensional space

Figure 7:
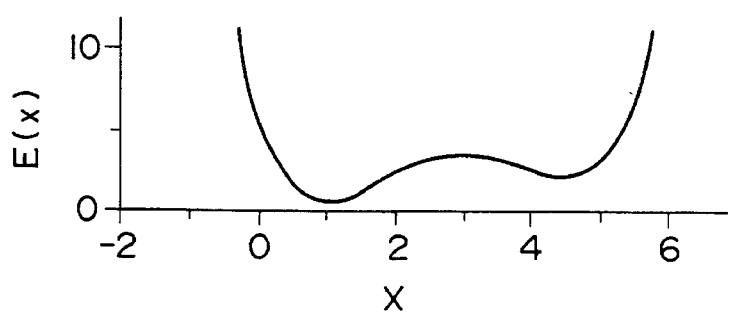
FIG. 7 is a characteristic diagram of a quartic energy function having two local minimum solutions.

For the purpose of grasping the characteristic of the CSD method, a calculational experiment was executed in a simple system. A quartic function having two local minimums as expressed by Eq. (6) was used as the energy function in such calculation. (See FIG. 7)

$$E(x)=0.25x^4-2.83x^3+10.5x^2-13.5x+6.0 \quad (6)$$

The equation of evolution employed for the CSD method was obtained by embodying the periodic nonlinear resistance function of Eq. (5) as follows.

$$m\ddot{x}+f(\dot{x}, \omega t)=-\epsilon\nabla E(x) \quad (7\text{-a})$$

$$f(\dot{x}, \omega t)=[d_0 \sin(\omega t)+d_1]\dot{x}+d_2\dot{x}^2 \text{ sgn}(\dot{x}) \quad (7\text{-b})$$

where $d_0$ and $d_1$ are coefficients of the linear resistance; $d_2$ is a coefficient of the nonlinear resistance; and $\text{sgn}(\dot{x})$ is a sign function.

The resistance of the first term on the right side of Eq. (7-b) acts on the speed linearly, and its gain changes periodically from a positive resistance to a negative resistance. Meanwhile the resistance of the second term is a positive one having a constant gain to act on the speed direction at the square of the speed.

Figure 8:
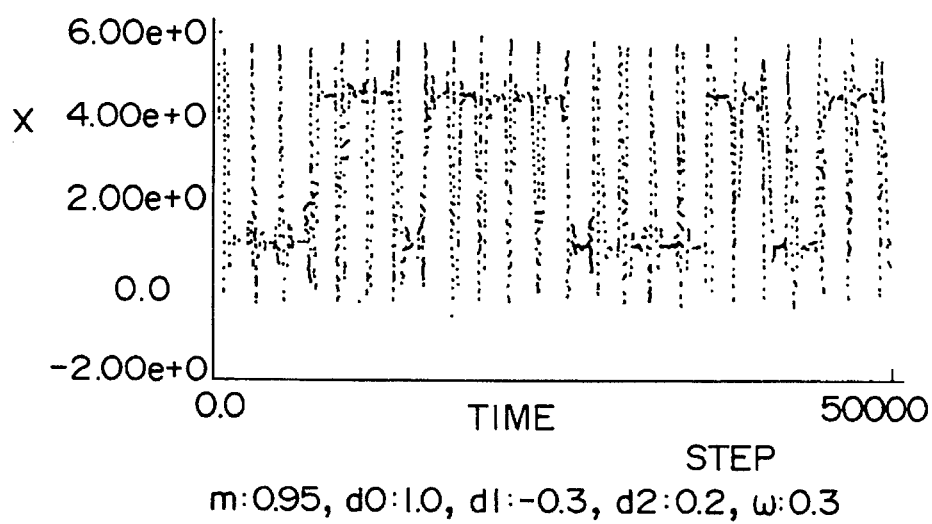
FIG. 8 graphically shows the result of temporally evoluting the function of FIG. 7 with addition of a periodic nonlinear resistance function thereto.

The temporal evolution of Eq. (7) was numerically obtained according to the Runge-Kutta method. The result of such calculation is partially shown in FIG. 8. In this diagram, there is observed an aspect where the state is shifted between the two local minimums. Such transition aspect of the state between the local minimums was observed for a long term, and no periodicity was noticed in the transition. In order to qualitatively grasp the mechanism of the transition between the local minimums, a Poincare map of the section ($x$, $\dot{x}^2$) in each phase of the periodically changing nonlinear resistance was formed.

There are three state quantities expressed by Eq. (7), including a variable x, a partial differential x dot, and a periodically changing nonlinear resistance. Representing the nonlinear resistance value by the phase of the sine function in Eq. (7), then the three state quantities are the variable x, the x dot and the phase. Therefore a Poincare map can be formed by establishing the phase at an adequate fixed value and plotting the x and x dot value on a quadratic plane.

Figure 9:
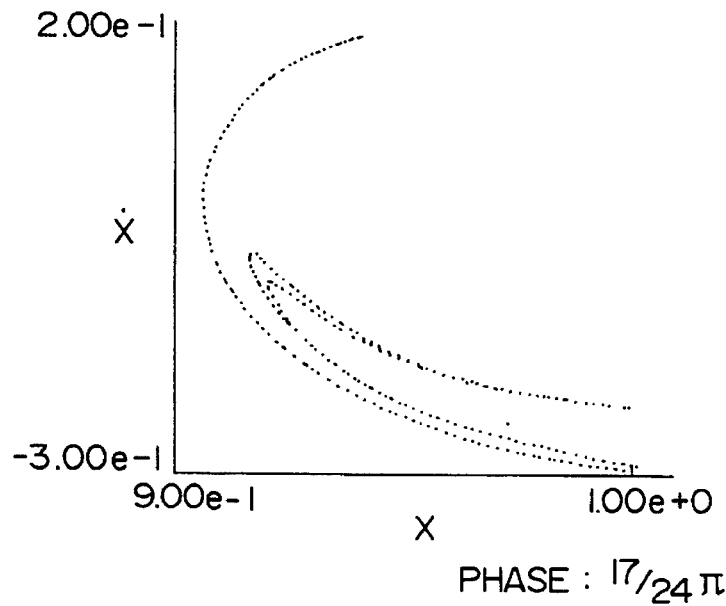
FIG. 9 is a Poincare sectional view in a predetermined phase of a periodically changing nonlinear resistance.
Figure 10A:
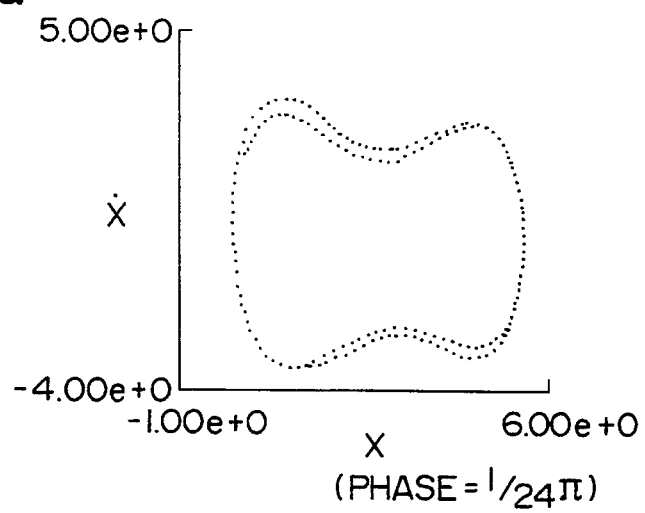
Figure 10B:
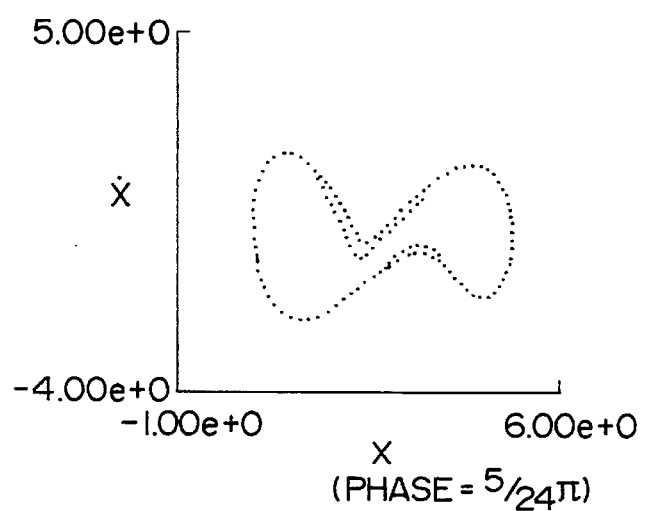
Figure 10C:
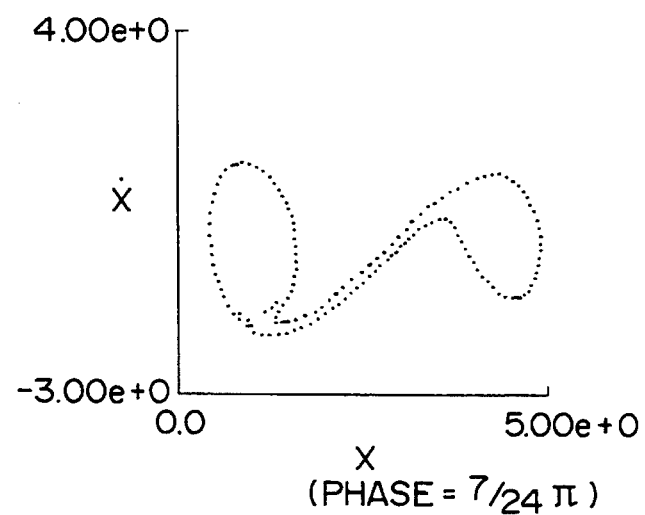
Figure 10D:
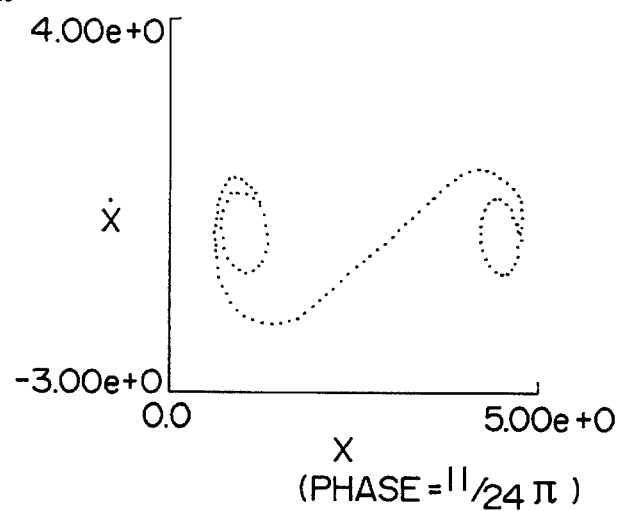
Figure 10E:
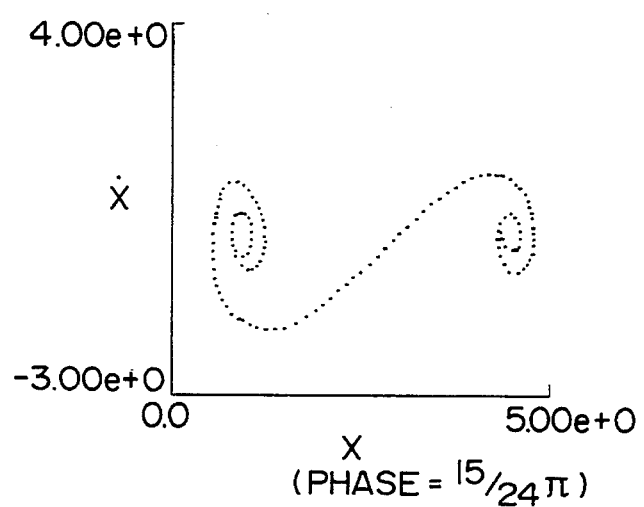
Figure 10F:
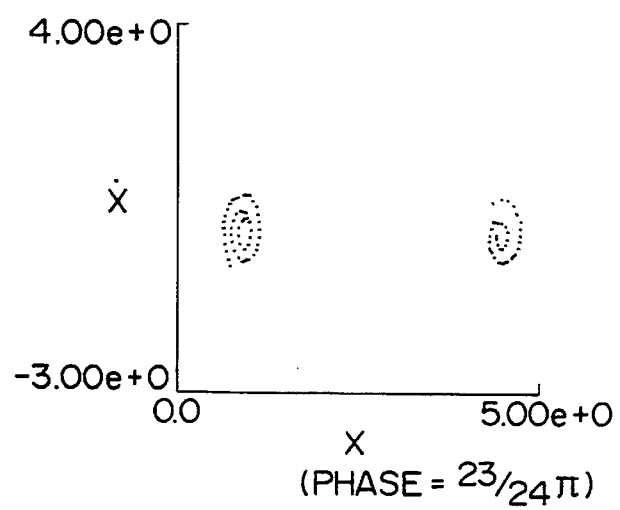
Figure 10J:
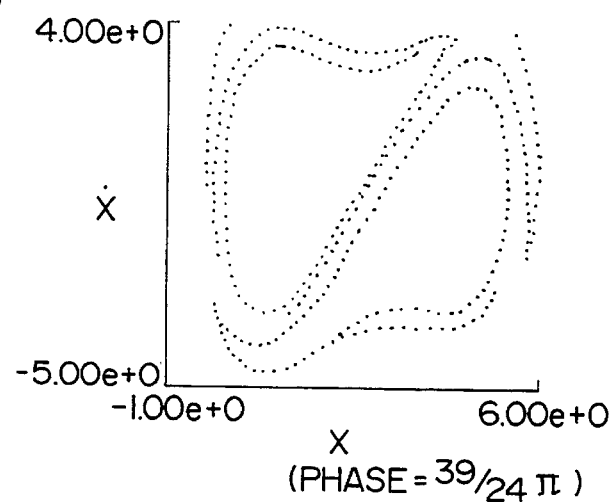
Figure 10K:
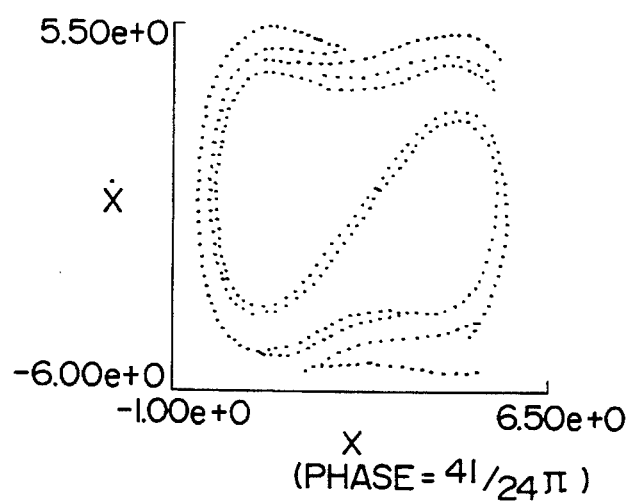
Figure 10L:
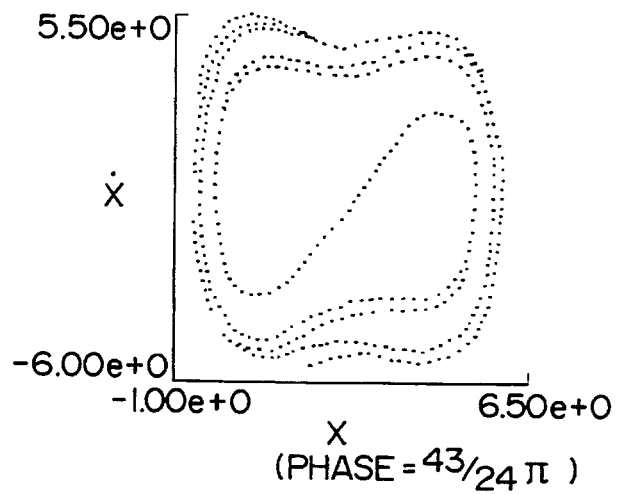

FIG. 9 is an enlarged graphic representation of a Poincare section (where the phase is $(17/24)\pi$) formed from the temporal evolution of 10,000 periods after stabilization to a steady state. In this diagram is observed a fractal structure in an aspect with fold of the path inherent in the chaos attractor. FIGS. 10a to 10l show the states of the Poincare section obtained by changing the phase from 0 to $2\pi$. From the illustrated aspects of the Poincare section varied with the phase changes in one period, it is seen that such fractal structure is formed as a result of the extension and fold of the path which are repeated endlessly.

Figure 11:
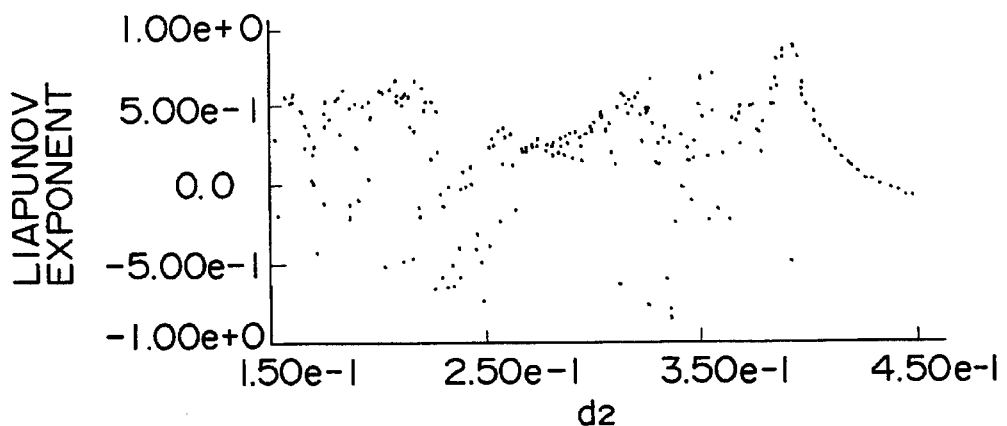
FIG. 11 graphically shows variations caused in the Liapunov exponent by changes of a parameter.

FIG. 11 shows the aspect of changes caused in the Liapunov exponent when a parameter $d_2$ in Eq. (7-b) is changed. ("Advanced Synergetics", Hermann Haken, Springer-Verlag, Berlin (1983)). It is apparent therefrom that the range where the Liapunov exponent is positive corresponds to the region of chaos and also that the generation of chaos is general.

(3) Application to back propagation learning

(3-1) Method of calculation

A chaotic learning is attempted by replacing the steepest descent method, which is employed for error back propagation (hereinafter referred to as BP), with the CSD method. In this case, the mechanism of the back propagation is left unchanged, and renewal of the interconnection weight is made to conform with Eq. (8) shown below.

$$m\ddot{w}_{ij}+f(\dot{w}_{ij}, \omega t)=-\epsilon\nabla E(w_{ij}) \quad (8)$$

where $w_{ij}$ denotes a connection weight from unit i to unit j.

However, in a binary (1 or 0) pattern learning, the connection weights may be diverged infinitely to achieve the upper and lower saturation values of a sigmoid function. For averting such a fault, there is considered a range of absolute values of practical connection weights, and the energy gradient is corrected in a manner to impose a penalty when the connection weight is in excess of such absolute value range. Final calculations are executed according to the following equations.

$$m\ddot{w}_{ij} + f(\dot{w}_{ij}, \omega t) = -\epsilon \nabla E(w_{ij}) + \begin{cases} 0 \; (-w\_limit \leq w_{ij} \leq w\_limit) & (9\text{-a}) \\ -wed\_limit \; (w_{ij} > w\_limit) \\ wed\_limit \; (w_{ij} < -w\_limit) \end{cases}$$

$$f(\dot{w}_{ij}, \omega t) = [d_0 \sin (\omega t) + d_1] \dot{w}_{ij} + d_2 \dot{w}_{ij}^2 \; sgn \; (w_{ij}) \quad (9\text{-b})$$

where w_limit denotes the range of absolute values of connection weights, and wed_limit denotes the energy gradient corrected by a penalty.

(3-2) Learning of EXOR

Figure 12:
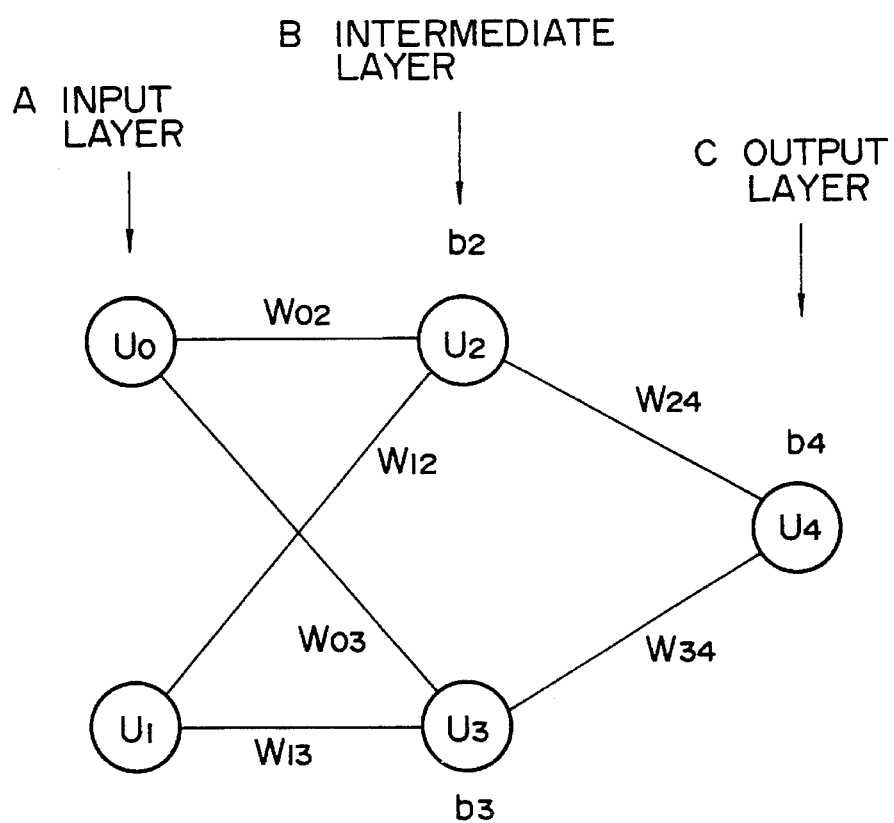
FIG. 12 shows the constitution of an EXOR learning neural network.

A learning of EXOR (exclusive logical sum) was attempted in a neural network of FIG. 12 by the CSD method. In such neural network, units $U_0$, $U_1$ were arranged in an input layer A, units $U_2$, $U_3$ in an intermediate layer B, and a unit $U_4$ in an output layer C, respectively. The parameters in Eq. (9) were set as follows:

m=0.95; $d_0$=0.09; $d_1$=−0.10; $d_2$=1.00; ω=0.003; w_limit= 8.0; wed_limit=0.1

Figure 13:
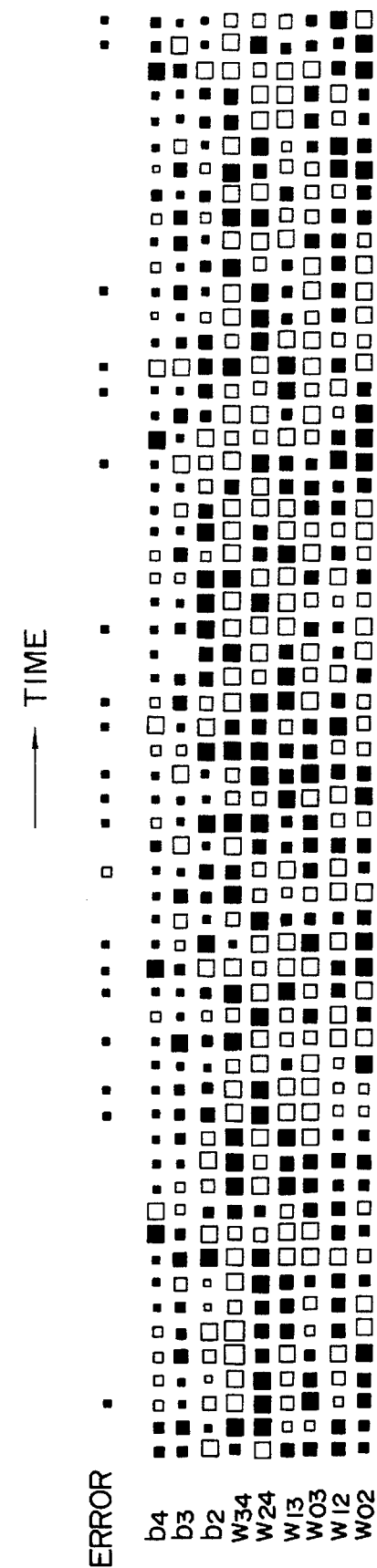
FIG. 13 illustrates transitions of the state in the EXOR learning process.

FIG. 13 illustrates transitions of the state obtained as a result of calculating momentary evolutions in 100,000 steps. There are plotted the connection weights in each period when the position of the periodic nonlinear resistance is π/2, i.e., at the instant where the positive resistance portion is maximum and the state is close to the vicinity of the equilibrium point. Each of the squares in the uppermost row signifies, by its size, the learning square error per period. The nine rows of squares under the uppermost row signify six connection weights (w02, w12, w03, w13, w24, w34) and bias values (b2, b3, b4) of three units U2, U3, U4. The size of each white square represents a positive value, and that of each black square represents a negative value, respectively.

According to the result of such calculations, a minimum solution was substantially obtained in each period. The states of interconnection at the individual instants were various, and no periodicity was noticed with respect to the way of appearance thereof.

Subsequently an adequate initial value was set, and then another initial value was prepared by adding a slight perturbation thereto. And an operation of mutually comparing the respective temporal evolutions from such two initial values was repeated. As a result, it was observed that a discrepancy began to occur therebetween after the lapse of several periods, and then the transitions in the respective evolutions became entirely different from each other. This fact indicates that the temporal evolution in this system is extremely sensitive to the initial value and is unpredictable. And generation of chaos in the above learning process is presumed from the results thus attained.

Figure 14A:
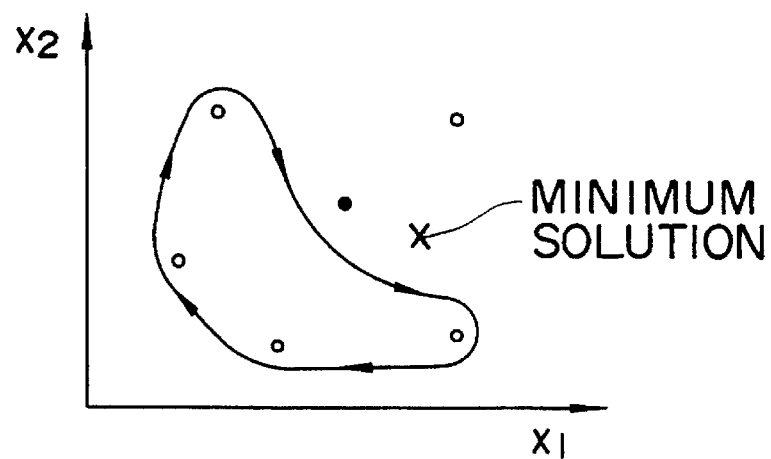
FIGS. 14a and 14b shows how a minimum solution is searched.
Figure 14B:
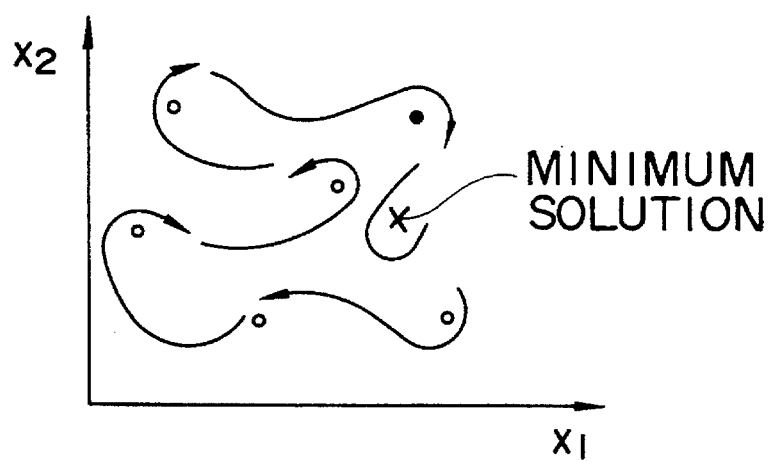
Figure 15C:
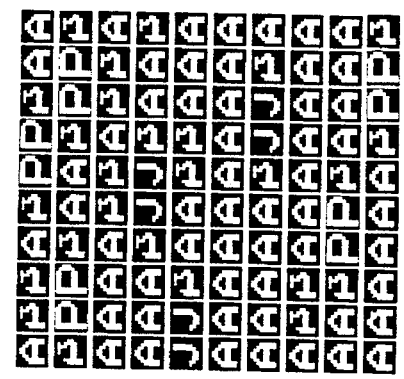
FIGS. 15a to 15e show transitions of the state in individual periods during a memory recall.
Figure 15B:
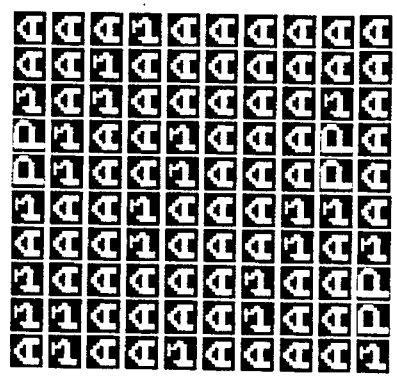
Figure 15E:
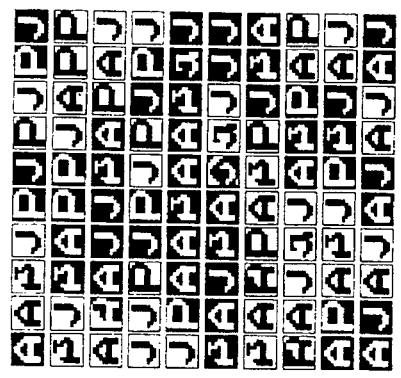
Figure 15A:
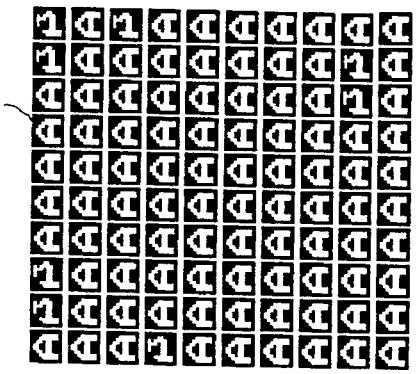
Figure 15D:
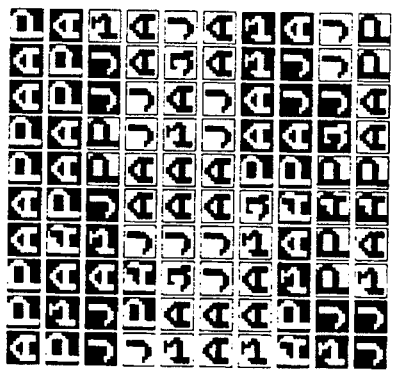

In case the dynamic characteristic of the search is periodic, as shown in FIG. 14a, the search process becomes a single limit cycle which advances merely through limited local minimum solutions. In this case, the possibility that the minimum solution is included in the group of such local minimum solutions is rendered lower in conformity with a decrease of the period length. And whether the limit cycle includes the minimum solution or not depends on the initial value. Meanwhile, when the period is infinitely long, the search comes to travel many local minimum solutions as shown in FIG. 14b, hence raising a possibility of arrival at the minimum solution. In other words, a chaotic search is achieved.

(3-3) Possibility of the invention to "Dilemma of Stability and Plasticity".

When the parameter $d_2$ in the CSD method is changed, it causes a change in the characteristic of local minimum transitions. In most cases, the state of interconnection is not changed so widely in an individual local minimum transition. However, there is repeated a process where a great change of the state occurs somewhere during progress of the transition and thereafter small state changes are induced continuously. Such dynamic characteristic is similar to intermittent chaos which enables hierarchical memory recall disclosed in the aforementioned "Memory Dynamics in Asynchronous Neural Network", and also in "On Constitution and Utilization of Significant Conceptual Space by Chaos Neutral Network" (Shingaku Giho, Natural Language Processing 71-5 (1989)), and "Nonlinear Dynamics and Information Processing" (Mathematical Science, 70, No. 311 (May 1989)).

As viewed from the learning, the attribute of such intermittent chaos retains a possibility of serving as a means of solution for the "dilemma of stability and plasticity" in the requirement to be adaptive flexibly for a new pattern while preserving the memory structure obtained previously, as disclosed in "A Massively Parallel Architecture for A Self-organizing Neural Pattern Recognition Machine" (Computer Vision Graphics and Image Processing, 54-115 (1987) 37). In the case of searching an interconnection state adapted for a new environment, it may be rendered possible by the intermittent chaos to employ a scenario which first searches the vicinity of the current interconnection state while regarding the same as an initial value and, upon failure of finding an optimum solution, continues searching a solution space further apart therefrom.

The aforementioned Eq. (7-b) may be so set as follows to give a periodicity.

$$f(x, \omega t) = [d_0 \sin (\omega t) + d_1] \dot{x}^3 + d_2 \dot{x} \quad (10)$$

Although this invention is not exactly based on a biological view, it is expected that, if the chaotic dynamic model proposed by this invention is placed on the dynamic basis of the present known neural network models, such networks may be equipped with high flexibility to realize new dynamic characteristics.

(4) Application to Hopfield network

Relative to the Hopfield (interconnection type) network, there are proposed applications to optimization represented by a problem of salesman's round or the like, and also to an associative memory where a complete pattern is recalled from an incomplete input pattern. Here a notice is given particularly to the latter application, and a trial is conducted to render a memory recall process chaotic by introducing the CSD method into a Hopfield network.

(4-1) Method of calculation

The energy of the system is defined here as $$E = -\Sigma w_{ij} a_i a_j \quad (11)$$

where $a_i$ denotes the output value of unit i consecutive in a range from −1 to 1; and $w_{ij}$ denotes the connection weight between unit i and unit j. The relationship between the output value of each unit and the internal state $u_i$ thereof is determined by a monotone increasing function given below.

$$a_i = 2 \tanh u_i - 1 \qquad (12)$$

where tanh signifies a sigmoid function, and $u_i$ signifies $$u_i = \sum_j w_{ij} a_j \qquad (13)$$

The partial differential of the energy E in the unit $u_i$ is expressed as follows:

$$\partial E/\partial u_i = (\partial E/\partial a_i)(\partial a_i/\partial u_i) = -(\partial a_i/\partial u_i)\Sigma w_{ij} a_j \qquad (14)$$

Considering that $\partial a_i/\partial u_i$ in Eq. (14) is always positive, a temporal evolution equation for the internal state of the unit i is formed as follows according to Eq. (5).

$$m\ddot{u}_i + f(\dot{u}_i, \omega t) = \epsilon \Sigma w_{ij} a_j \qquad (15)$$

where $\epsilon$ is a positive coefficient. Similarly to Eq. (9), a practical absolute value range of the unit i is set, and the energy gradient is so corrected as to impose a penalty when the absolute value is caused to exceed such range. Then final equations are as follows:

$$m\ddot{u}_i + f(\dot{u}_i, \omega t) = \epsilon \Sigma w_{ij} a_j + \begin{cases} 0 \; (-u\_limit \leq u_i \leq u\_limit) & (16\text{-a}) \\ -ued\_limit \; (u_i > u\_limit) \\ ued\_limit \; (u_i < -u\_limit) \end{cases}$$

$$f(\dot{u}_i, \omega t) = [d_0 \sin(\omega t) + d_1]\dot{u}_i + d_2 \dot{u}_i^2 \, sgn(\dot{u}_i) \qquad (16\text{-b})$$

where u_limit is the absolute value range of the internal state of the unit, and ued_limit is the energy gradient corrected by a penalty.

(4-2) Calculational experiment

An experiment was executed in such a manner that patterns of three characters "A", "J", "P" were embedded or stored as a memory in a network having 100 (10×10) units (a binary value 1 or 0 was embedded in each of 10×10 units to express a character A, J or P), and such patterns were chaotically recalled (i.e., patterns similar to the key pattern were successively recalled by the chaotic steepest descent method). The interconnection weights for embedding the memory are calculated according to the following equation.

$$w_{ij} = \sum_m a_i^m a_j^m \qquad (17)$$

where $a_i^m$ is the value of the m-th pattern unit i. From the results of such calculational experiment for the back propagation learning, it was observed that any great Change of the state became intermittent with an increase of the parameter $d_2$. A notice is given here particularly to whether the same dynamic characteristic is also induced or not in the process of memory recall. In the experiment where the value of the parameter $d_2$ was gradually changed from 11.0 to 8.0, the initial state (key pattern) relative to each of such parameter values was set to the same character pattern "A", and the minimum transitions in 100 periods were observed. The parameters other than $d_2$ were set as m=1.0, $d_0$=1.0, $d_1$=−2.0, $\omega$=0.12, $\epsilon$=0.001, u_limit=8.0, ued_limit=0.1, respectively. FIGS. 15a to 15e illustrate the minimum transitions caused when the parameter $d_2$ is changed to 10.5, 10.3, 10.2, 9.0 and 8.5, respectively. In these drawings are plotted the stable-duration states in the individual periods sequentially from the upper left to the lower right with the lapse of time.

A binary 1 or 0 is stored in each of 10×10 units so that a character A (m=1), J (m=2) or P (m= 3) can be displayed as a whole. And connection weights (coefficients) between the individual units are determined according to Eq. (16). This signifies that three (m=3) patterns have been learned (embedded) [learning phase]. Subsequently a character A is inputted as a key pattern (initial value), and the patterns similar to the key pattern are recalled successively by the chaotic steepest descent method [memory recall phase].

The upper left pattern illustrated in each of FIGS. 15a to 15e is the key pattern inputted as an initial state, and the right pattern adjacent thereto is the one recalled first from the key pattern in the 10×10 units. (This corresponds to one period.) And the next right pattern adjacent thereto is the one associated in the next period. In each of FIGS. 15a to 15e, there are shown the patterns in 100 periods.

The results of the above experiment are summarized as follows. When the parameter $d_2$ is increased to be greater than 10.5, no state transition occurs from "A" to any other pattern. In case the parameter $d_2$ is set to 10.5, there occurs intermittently a transition to a false attractor "A|P" where "A" and "P" are superposed on each other. If the parameter $d_2$ is decreased to 10.3, a transition between "A" and "A|P" becomes frequent with intermittent occurrence of a new transition to "P". When the parameter $d_2$ is changed to 10.2, a transition to "J" is additionally induced. With a further decrease of the parameter $d_2$ to 9.0, there begins to appear an inverse pattern where on/off (1/0) of each pattern is inverted. In this stage, such pattern inversion is merely intermittent, and once an inversion occurs, transitions among the four patterns of "A", "A|P", "P" and "J" are caused successively within that range.

When the parameter $d_2$ is further decreased to 8.5, transitions among the entire patterns including inverse ones come to occur in disorder. Thereafter the relationship between the parameter $d_2$ and the range of mutual transition patterns remains substantially unchanged despite any further change of the initial state.

It is presumed from the above results of the experiment that, by control of the parameters, the range of searching the memory is varied through the intermittent chaos and a decisive branch structure is existent therein.

(4-3) Consideration

Figures 16, 17:
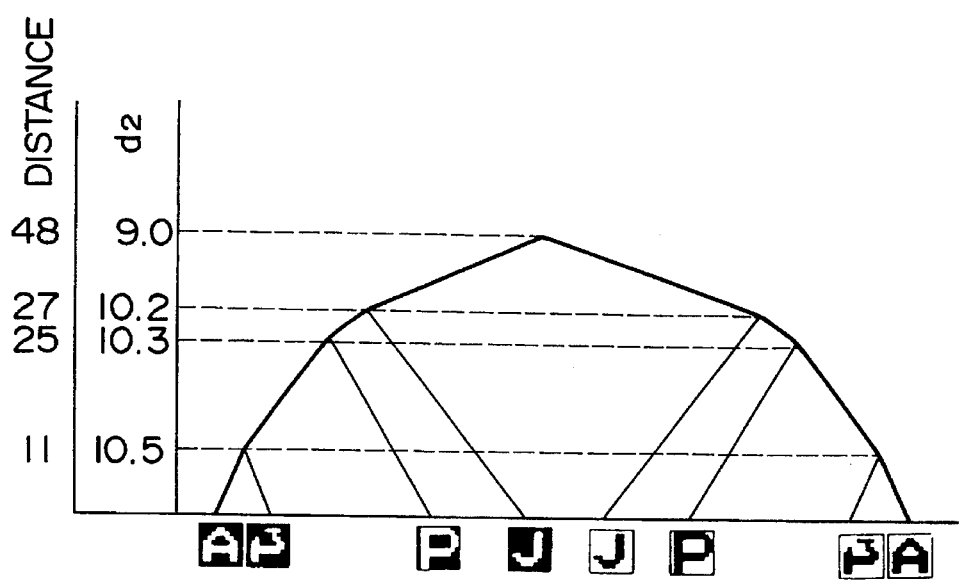
FIG. 16 illustrates Hamming distances between memory patterns.
FIG. 17 shows the structure of a memory which forms a supermeasuring space.

Here is given a consideration on the relation between the branching process derived from changes of the parameter $d_2$ and the memory structure embedded in the network. FIG. 16 illustrates a matrix of mutual Hamming distances among eight patterns including a false attractor pattern and an inverse pattern (where white and black are inverted), wherein the measures of similarity among the memory patterns are expressed as a tree structure by a single linkage clustering method (nearest-neighbor algorithm which is one of the hierarchical clustering techniques). Also with regard to the branching process, a group of patterns where mutual state transitions are caused relative to the individual values of the parameter $d_2$ are clustered and expressed as a tree structure.

Comparing such two tree structures with each other, it is seen that they are mutually equivalent as shown graphically in FIG. 17. This graph indicates an interesting result that the branch structure in the chaotic memory search is superposed on the supermeasuring space based on the similarity degree of the memory patterns. Furthermore, such result is considered to correspond also to the tree-like memory shown in the network system which is composed of neural elements having probability fluctuations in the cited reference "Information Processing of Brain and Chaos".

The chaotic steepest descent method has been proposed hereinabove. Generation of chaos based on the proposed dynamic model is presumed from the fold of the path observed in the calculational experiment of the one-dimensional system. As a result of applying such dynamic model to the learning algorithm of error back propagation, it has been confirmed that state transitions are caused by the intermittent chaos during the learning process. In the learning, such intermittent chaos is considered to serve as a clue for one solution to the aforementioned "dilemma of stability and plasticity". Further as a result of applying this dynamic model to memory recall in the Hopfield network, the values of the parameters are influential on the memory search range. In addition, the cluster structure of the memory pattern is reflected on the branching process of the memory recall. Thus, there is attained a conclusion from the above that an effective dynamic characteristic can be achieved by incorporating the chaos dynamic model in a neural network based on the Liapunov stability.

In further, we studied an alternative of (16-a), replacing the penalty term by a capacitance term as shown in (16-c).

$$m\ddot{u}_i + f(\dot{u}_i, wt) + K u_i = \epsilon \Sigma W_{ij} a_j \qquad (16\text{-}c)$$

where K is a capacitance coefficient.

We obtained the results that the alternative shows the same characteristics.

(5) Application to robot path planning

With the recent progress of factory automation, it has become customary to employ robots for executing a variety of works. In actuating a robot for execution of a predetermined work by displacing an arm (manipulator) of the robot from one predetermined position to another, the robot is controllable with relative facility if there exists no obstacle in the working space. In most cases, however, various obstacles other than a desired object are existent in the working space. When any obstacle exists in the working space, the manipulator needs to be so displaced as not to touch the obstacle, whereby the control thereof is not exactly simple. As an exemplary means to avoid an obstacle, there is known a potential method as disclosed in "Avoiding An Obstacle" (Journal of Artificial Intelligence Society, Nov. 1990, pp. 731–736).

However, such potential method has a disadvantage that, when the manipulator has fallen into a local minimum of the potential, it is impossible for the manipulator to escape therefrom, and consequently the robot path comes to a halt at the position of such local minimum. Some means are also disclosed in the above cited reference with regard to escape from a local minimum, but any of them merely indicates a principle and offers none of specific process for escape.

(5-1) Procedure for robot path planning

Figure 18:
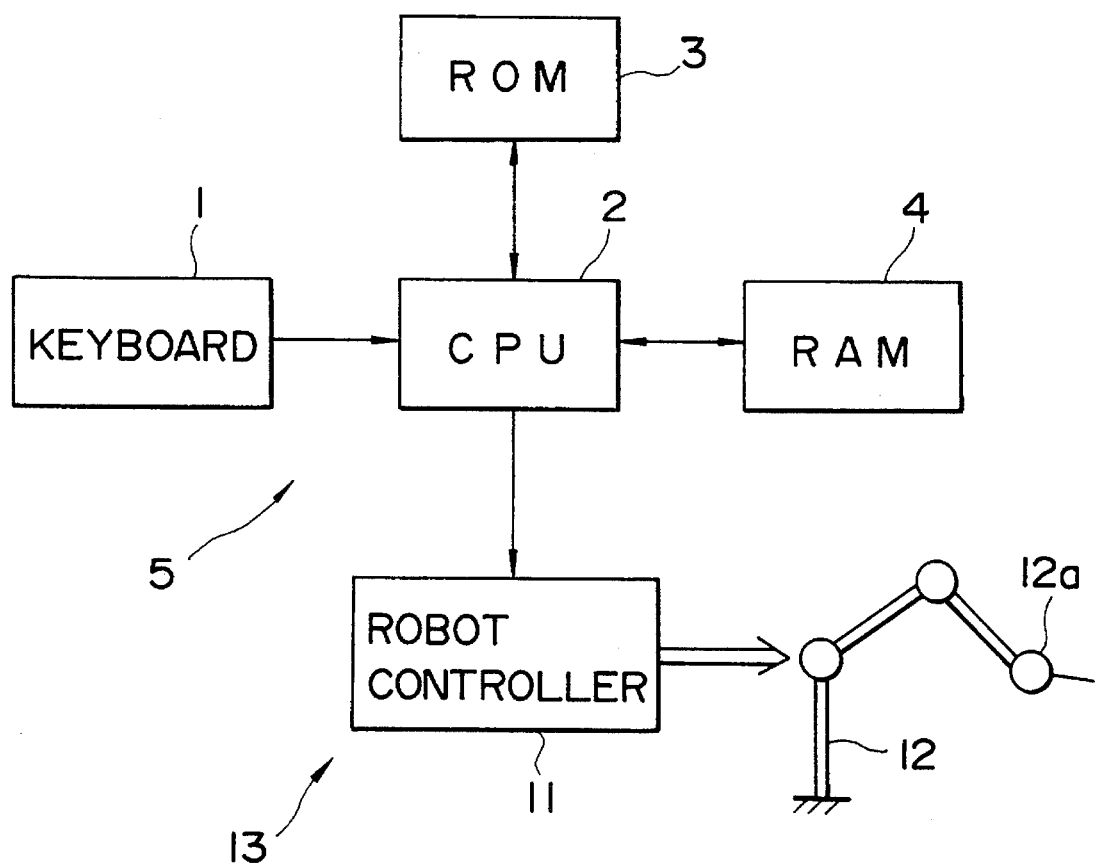
FIG. 18 is a block diagram showing the constitution of an exemplary apparatus to perform a robot path planning by the use of the signal processing method of the present invention.

FIG. 18 is a block diagram showing the constitution of an exemplary apparatus contrived for planning a robot path by the application of the signal processing method according to the present invention. This apparatus comprises a controller 5 (such as a work station) which consists of a keyboard 1 for inputting various commands to a CPU 2, the CPU 2 for executing various calculations in response to the commands from the keyboard 1, a ROM 3 for storing a program or the like, and a RAM 4 for storing various data in compliance with requirements; and an articulated robot 13 which consists of a robot controller 11 supplied with a program or data via a cable RS232 or the like, and a manipulator 12 to perform a predetermined work under control of the robot controller 11.

Figure 19:
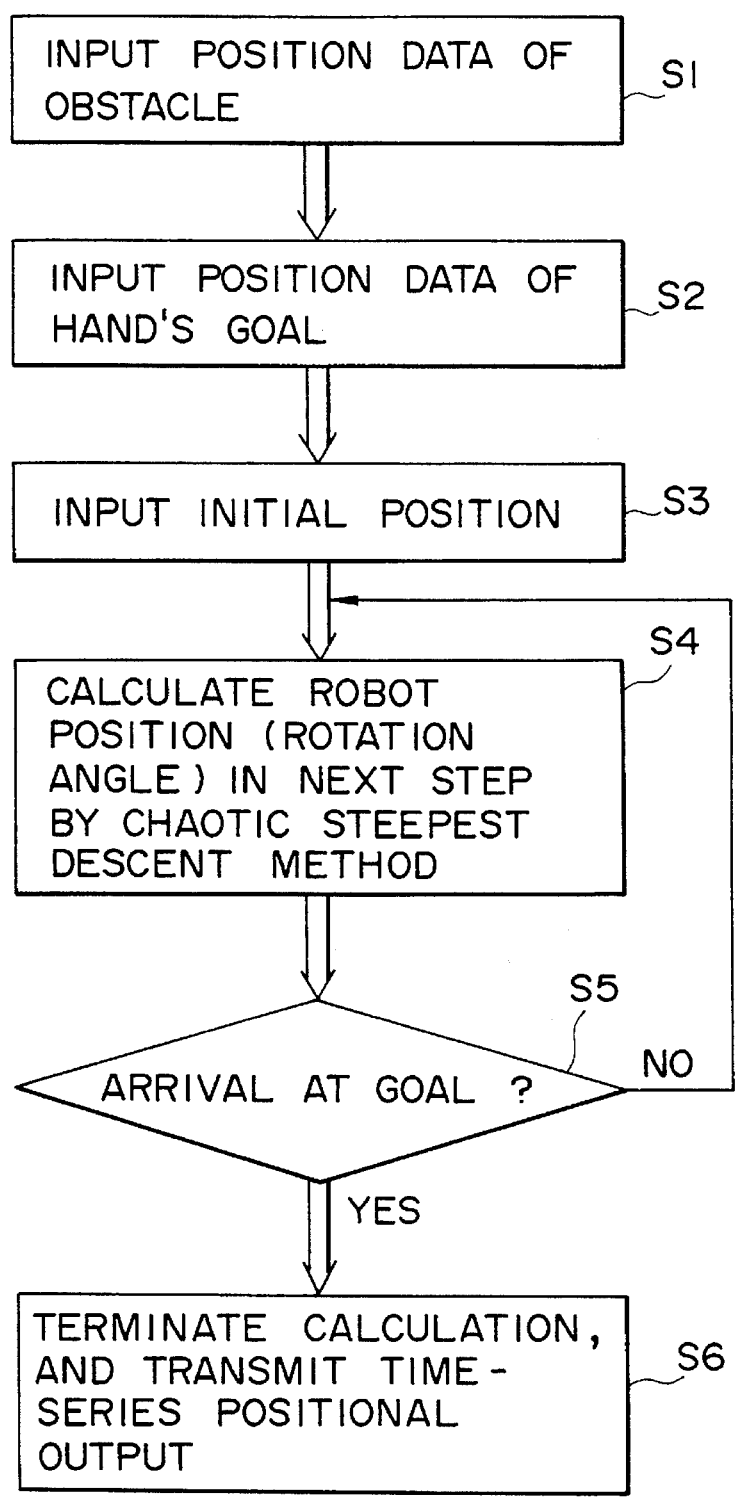
FIG. 19 is a flow chart of an operating procedure executed in the apparatus of FIG. 18.

Now the operation of the above apparatus will be described below with reference to a flow chart of FIG. 19. First the keyboard 1 is actuated to input the position data of an obstacle (not shown) existing in the working space of the manipulator (Step S1). Then, the position data of a desired goal for a hand 12a of the manipulator 12 is inputted (step S2). Thereafter, the initial position data of the manipulator 12 is inputted (step S3). Upon input of such data, the CPU 2 transmits the data to store the same in the RAM 4.

Subsequently, according to the aforementioned chaotic steepest descent method, the CPU 2 calculates the next position to which the manipulator 12 is to be displaced from the initial position inputted in step S3 (step S4). In this stage, the calculation is so executed as to ensure that any portion of the manipulator 12 is kept out contact with the obstacle (of which position data is inputted in step S1) and also that the hand 12a of the manipulator 12 is moved toward the desired goal (of which position data is inputted to step S2). It is a matter of course that, if any portion of the manipulator 12 happens to be in contact with the obstacle during an approach to the goal, there may occur a case where a predetermined point receding from the goal is selected. Upon completion of calculating the predetermined position next to the initial position, the calculated value (corresponding to the next position) is stored in the RAM 4.

After the next position of the manipulator 12 is thus obtained, the CPU 2 makes a decision, upon displacement of the manipulator 12 to the calculated position, as to whether the hand 12a has already arrived at the goal inputted in step S2 (step S5). If the result of such decision is negative, the operation reverts to step S4, and the next displacement position is calculated according to the chaotic steepest descent method with reference to the preceding calculated position (current position). Such process is repeated until arrival of the hand 12a at the goal.

The calculation is terminated upon arrival of the hand 12a at the goal, and the time-series data of the displacement position obtained in step S4 is outputted (as robot path data program) to the robot controller 11 [step S6]. In response to the robot path data or program thus received from the CPU 2, the robot controller 11 displaces the manipulator 12 in accordance with the input data or program, whereby the manipulator 12 is displaced properly while being kept out of contact with the obstacle and finally the hand 12 thereof arrives at the desired goal.

Now a description will be given on the chaotic steepest descent method adopted for calculation of the robot path. Supposing that the manipulator 12 (of the articulated robot 13) has n axes, the attitude of the manipulator 12 can be expressed by a rotation angle vector q of Eq. (18) in each axis. In this equation, the vector is denoted with a horizontal line added above q.

$$\bar{q} = (q_1, q_2, q_3 \ldots q_n) \qquad (18)$$

When the manipulator 12 takes an attitude vector q, the proximity to a near obstacle is expressed by a function of Eq. (19) as follows.

$$f(\bar{q}) \qquad (19)$$

The function of Eq. (19) indicates a monotone increase in accordance with a reduction of the distance between the obstacle and the manipulator 12.

The proximity of the hand 12a to the goal is expressed by a function of Eq. (20), where $x_g$ is a vector corresponding to the goal of the hand 12a, and x is a vector corresponding to the current position of the hand 12a.

$$g(\bar{x}, \bar{x}_g) \qquad (20)$$

The function of Eq. (20) indicates a monotone decrease in accordance with an increase of the proximity to the goal. Since the vector q is uniquely determined from the vector x, Eq. (21) is obtained as follows.

$$g(\bar{x}, \bar{x}_g) = g(r(\bar{q}), \bar{x}_g) = G(\bar{q}, \bar{x}_g) \qquad (21)$$

Figure 20:
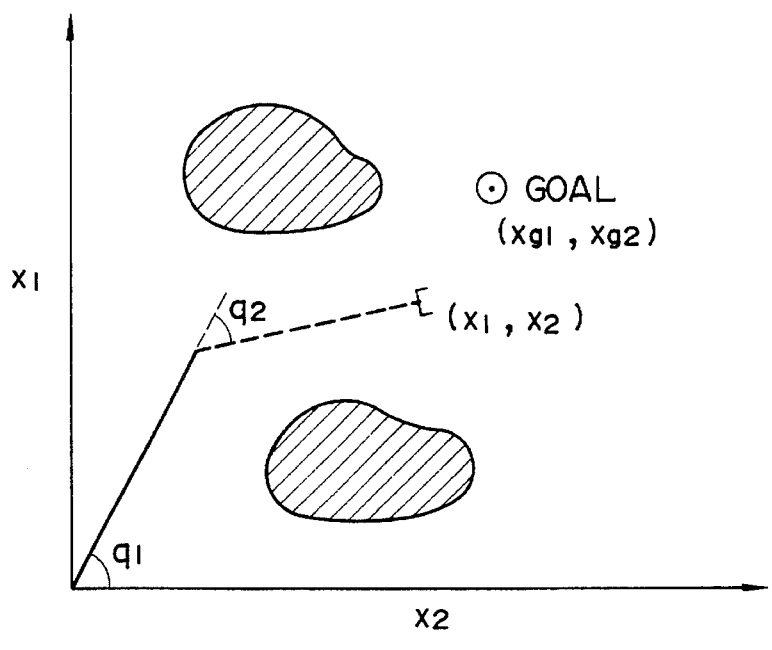
FIG. 20 shows coordinates of a working space in the apparatus of FIG. 18.
Figure 21:
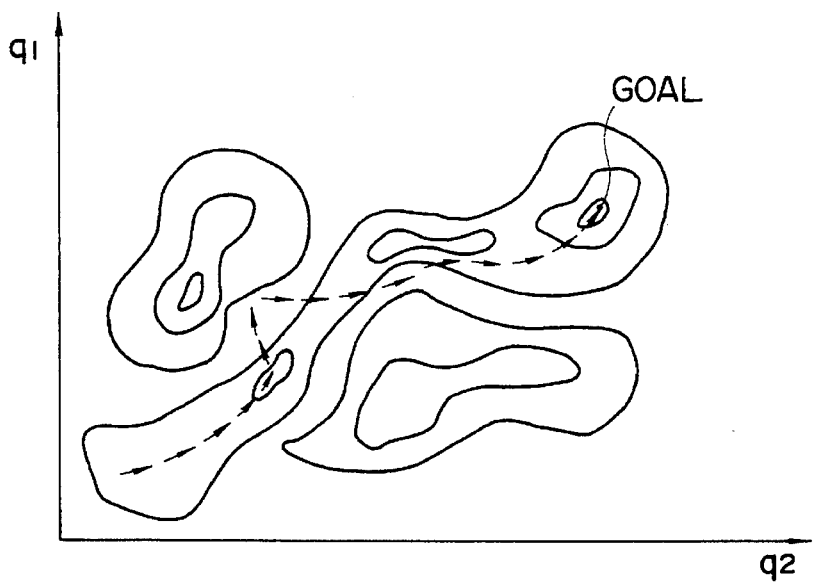
FIG. 21 shows a state where the space in FIG. 20 is converted to a coordinate system of rotation angle.
Figure 23D:
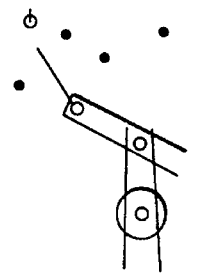
FIGS. 23a to 23e illustrate how the manipulator reaches the desired goal continuously with FIG. 22h while avoiding the obstacles.
Figure 23C:
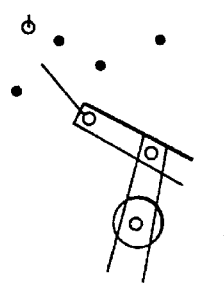
Figure 23B:
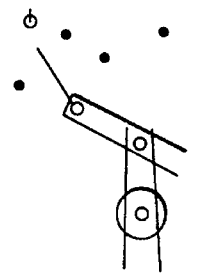
Figure 23A:
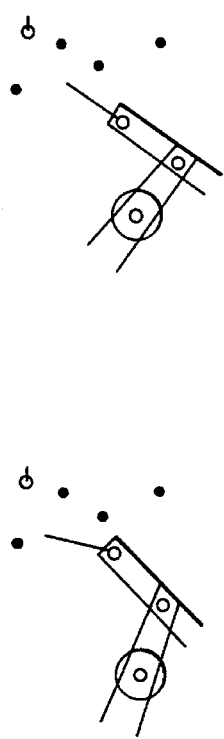
Figure 23E:
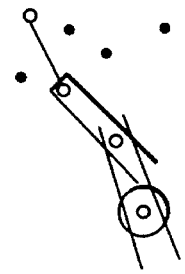
Figure 24:
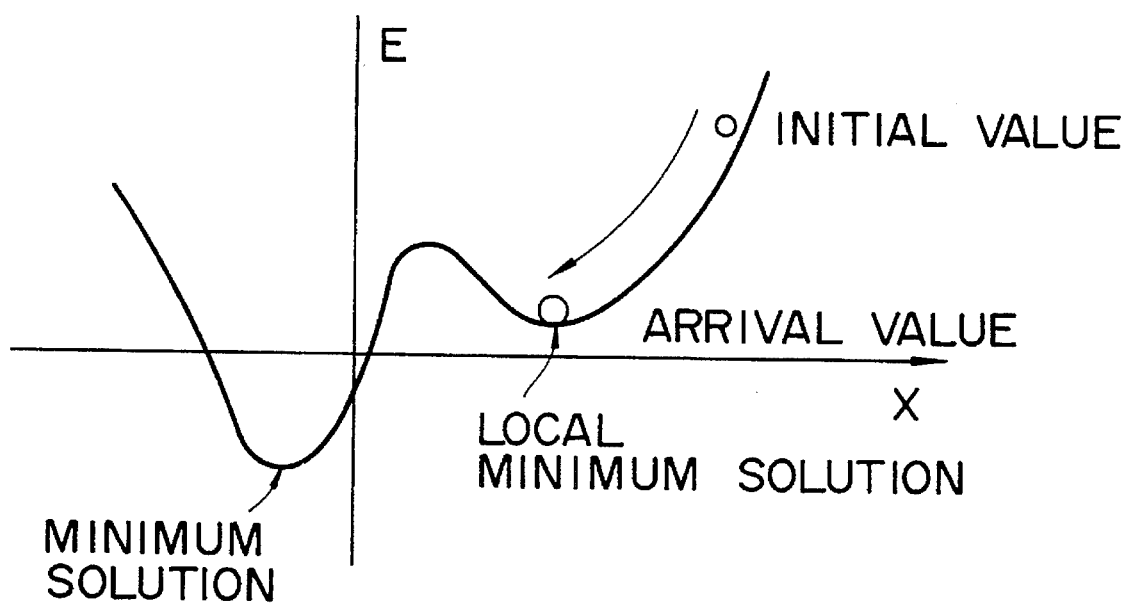
FIG. 24 graphically shows an energy function characteristic for explaining a conventional method of searching a minimum solution.

The coordinate system of the working space of the manipulator 12 represented by x1, x2 as shown in FIG. 20 for example (where the goal is represented by coordinates xg1, xg2) can be converted to another coordinate system of FIG. 21 represented by rotation angles q1, q2 of the arms of the manipulator 12. The energy of such coordinate system is expressed as follows.

$$E(\bar{q}, \bar{x}_g) = k_f f(\bar{q}) + k_g G(\bar{q}, \bar{x}_g) \qquad (22)$$

In the above, $k_f$ and $k_g$ are constants for weighting f (function to the obstacle) and G (function to the goal) respectively to make adjustment in such a manner that the energy of the system expressed by Eq. (22) becomes minimum when the manipulator 12 has arrived at the goal. Namely, the energy E increases in accordance with an approach of each portion of the manipulator 12 to the obstacle or decreases in accordance with an approach of the hand 12a to the goal. Determination of a robot path corresponds exactly to calculation of a temporal evolution of the vector q obtained in the process of searching, from the vector $q_0$ representing the initial attitude (initial position) of the manipulator 12, the vector $q_g$ (attitude to the goal) which is a solution to minimize the energy E.

More specifically, the working space of the manipulator 12 shown in FIG. 20 is converted to the coordinate system of rotation angles shown in FIG. 21, and there is calculated a path up to a desired goal with sequential displacements by way of the position where the energy is minimum in such coordinate system.

In the steepest descent method, it is ensured that, as expressed by Eq. (23), the direction of change of the vector q is coincident with the direction of the energy gradient at the relevant point and also that the temporal evolution of Eq. (24) obtained by rewriting Eq. (23) to a continuum is converged to a minimum. Eq. (24) represents the Liapunov stability.

$$\Delta q = -\epsilon \nabla E(\bar{q}, \bar{x}_g) \qquad (25)$$

where $\epsilon$ is a positive constant.

$$\dot{\bar{q}} = -\epsilon \nabla E(\bar{q}, \bar{x}_g) \qquad (24)$$

Relative to the above, Eq. (25) signifies Eq. (26) as shown below.

$$\nabla E(\bar{q}, \bar{x}_g) \qquad (25)$$

$$\partial E(q, x_g)/\partial q \qquad (26)$$

Eq. (27) of motion is obtained by including a quadratic differential into Eq. (24) and introducing an inertia term (first term) and a divergence term (second term) also into Eq. (24).

$$m\ddot{q} + d\dot{q} = -\epsilon \nabla E(\bar{q}, \bar{x}_g) \qquad (27)$$

where m stands for a mass (m>0), and d for a resistance (d>0).

Figure 2:
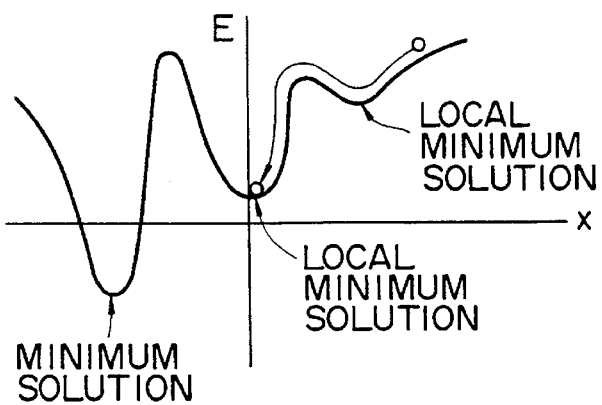
FIG. 2 graphically shows an energy function characteristic for explaining a local minimum solution and a minimum (optimum) solution.

In this case as well, there is acquired a dynamic characteristic that any small local minimum is skipped over by an inertial force, and a final point of arrival is definitely one of local minimum solutions as shown in FIG. 2, but it is not ensured that convergence to a minimum solution is attained without fail.

Therefore, as expressed in Eq. (28), a means is contrived to alter the structure of the asymptotic convergence to a minimum by introducing an adequate nonlinear resistance into the divergence term (second term) on the left side of Eq. (27).

$$m\ddot{q} + f(\dot{q}) = -\epsilon \nabla E(\bar{q}, \bar{x}_g) \qquad (28)$$

As described above, FIG. 3 shows an exemplary case of introducing a nonlinear resistance which serves as a negative resistance at a low speed or as a positive resistance at a high speed. In this case, Eq. (28) does not represent the Liapunov stability any longer. However, as shown in FIG. 4, the path obtained is stably converged to a limit cycle where, in a steady state, the minimum is at the center, and there is no alteration with respect to the composition that the path is led into the minimum basin.

For the purpose of unstabilizing the path obtained from Eq. (28), an attempt is made to periodically change the nonlinear resistance characteristic as expressed in Eq. (29).

$$m\ddot{q} + f(\dot{q}, \omega t) = -\epsilon \nabla E(\bar{q}, \bar{x}_g) \qquad (29)$$

In order to transit the limit cycle sequentially to other local minimum solution, the limit cycle is unstabilized periodically. For this purpose, the negative portion of the nonlinear resistance is periodically changed to be greater or smaller as shown in FIG. 1.

When the positive or negative resistance value is changed with a relatively slow period ($\omega$), the path is rendered stable in the phase of increasing the positive resistance and asymptotically approaches the minimum solution, whereas the path is rendered unstable in the phase of increasing the negative resistance and is urged to deviate from the minimum solution. It is therefore presumed that, in a proper procedure of changing the resistance, the path is caused to travel chaotically from one local minimum solution to another.

More specifically, if a periodically changing nonlinear resistance is introduced, the temporal evolution of the equation is such that, as graphically shown in FIG. 5, the path comes to sequentially skip over, for example, two minimum solutions 1 and 2 enclosed with circles in the diagram.

(5-2) Application to articulated robot

Hereinafter a description will be given with regard to an embodiment contrived by applying the present invention to a robot equipped with a three-axis manipulator 12. The following is a simulation of automatically preparing a robot path plan which enables a hand 12a of the three-axis manipulator 12 to arrive at a desired goal while avoiding any obstacle. In the practical manipulator 12, there exists a limit relative to the rotation angle of each axis. Therefore, in this simulation where such limit is taken into consideration, Eq. (30) representative of a rotation angle energy is additionally introduced into Eq. (22) of energy.

$$R(\bar{q}) \tag{30}$$

The value of Eq. (30) indicates a monotone increase in accordance with an approach of the vector q to the limit cycle, so that Eq. (22) is rewritten as follows.

$$E(\bar{q}, \bar{x}_g) = k_f f(\bar{q}) + k_g G(\bar{q}, \bar{x}_g) + k_r R(\bar{q}) \tag{31}$$

where $k_r$ is a constant for weighting R (function to the limit angle).

The energy relative to the obstacle conforms with Eq. (32) for example.

$$f(\bar{q}) = \begin{cases} k_{f1}(x_f - x)^2 + k_{f2}(x_f - x) & (x \leq x_f) \\ 0 & (x > x_f) \end{cases} \tag{32}$$

where x is the shortest distance between the relevant portion of the manipulator 12 and the obstacle when the manipulator has an attitude vector q; and $x_f$ is a constant. The energy is zero when the shortest distance is greater than $x_f$.

The energy G relative to the distance to the desired goal conforms with Eq. (33) for example.

$$G(\bar{q}, \bar{x}_g) = -k_{g1}(x_g - x)^2 - k_{g2}(x_g - x) \tag{33}$$

where $x_g$ is a constant (necessary to be greater than any presumed value of x), and x denotes the distance between the goal and the hand 12a having an attitude vector q.

The energy R relative to the rotation angle conforms with Eq. (34) for example.

$$R(\bar{q}) = \begin{cases} \sum_{i=1}^{3} \{k_{r1}(q_s - Qi)^2 + k_{r2}(q_s - Qi) & (Qi \leq q_s) \\ 0 & (Qi > q_s) \end{cases} \tag{34}$$

where Qi is an allowance angle up to the limit angle of the axis i, and $q_s$ is a constant.

Eq. (35) is an exemplary formula of the chaotic steepest descent method used for calculating the temporal evolution of the path of an articulated robot.

$$m\ddot{q}i + f(\dot{q}i, \omega t) = -\epsilon \partial E(\bar{q}, \bar{x}_g)/\partial qi \; f(\dot{q}i, \omega t) = [d_0 \sin(\omega t) + d_1]\dot{q}i + d_2\dot{q}i^2 \text{ sgn } (\dot{q}i) \tag{35}$$

where m, $\epsilon$, $d_0$ and $d_2$ are adequate positive coefficients; $d_1$ is a negative coefficient; and sgn is a sign function.

Eq. (36) corresponding to one term of Eq. (35) serves for approximation as represented by Eq. (37) in calculating numerical values.

$$\partial E(\bar{q}, \bar{x}_g)/\partial qi \tag{36}$$

$$\partial E(\bar{q}, \bar{x}_g)/\partial qi = [E(qi + \Delta q, \bar{x}_g) - E(qi, \bar{x}_g)]/\Delta q \tag{37}$$

The left side of Eq. (37) increases $\Delta q$ with respect to the axis qi to detect the variation component of the energy.

FIGS. 22a to 22h and 23a to 23e illustrate the simulation process, wherein four black dots denote obstacles, and one white circle denotes a desired goal of the hand 12a. As obvious from such figures, the manipulator 12 advances via a predetermined path (including low-energy positions), and the hand 12a arrives at the goal without contact with any of the obstacles.

As described hereinabove, according to the signal processing method of the present invention defined in the appended claim 1, the nonlinear resistance in the equation of motion is changed periodically to attain the following advantageous effects.

(1) In searching an optimum solution, a complete search can be performed efficiently in a solution space without being trapped by any of local minimum solutions.

(2) The range of the search is not restricted by any procedure of setting the initial value.

(3) Wide applications are rendered possible with respect to learning based on error back propagation, memory search in a Hopfield network, optimum solution search for the constraint problem and so forth.

According to the signal processing method defined in the appended claim 2, the term of the nonlinear resistance comprises a term acting on the speed linearly and a term acting on the speed direction at the square of the speed, so that no periodicity is induced in the state transition between local minimum values to consequently ensure a precise search of the optimum value with certainty.

According to the signal processing method defined in the appended claim 3, the range of absolute values of connection weights between the units is limited by the equation of motion, hence preventing a prolonged search time that may otherwise be caused by excessive extension of the search scope beyond the requisite, to eventually achieve an enhanced advantage for practical use.

According to the signal processing method defined in the appended claim 4, a plurality of patterns are stored previously in a Hopfield neural network, and the nonlinear resistance in the equation of motion is periodically changed so that a pattern similar to an input key pattern is recalled, whereby any desired pattern can be searched or retrieved out of the complicated patterns with rapidity and facility.

According to the signal processing method of the present invention, a term of a nonlinear resistance is included in an equation of the positional energy of a robot, and a process of calculating the next robot position of an optimum solution by periodically changing the nonlinear resistance is repeated to acquire the data of the robot path up to a desired goal, so that it becomes possible to exactly avert a fault that the path is brought to a halt at a local minimum solution. And any obstacle can be avoided with certainty and rapidity.

And according to the signal processing method of the present invention, the present invention is so contrived as to be adapted for an articulated robot, hence realizing wide applications to robots for a variety of uses.

What is claimed is:

1. A method of processing signals within a Hopfield neural network to successively position a robot from an initial position to a desired position by selecting an optimum path for the robot between the initial position and the desired position, comprising the steps of:

storing a plurality of patterns in the Hopfield neural network, the patterns representative of paths of the robot;

searching within the neural network for a stored pattern, the selected stored pattern representative of successive coordinates of the optimum path of the robot, the searching based upon data representative of the initial position of the robot, the desired position of the robot, undesired path coordinates and an equation of motion, the equation of motion including a term of nonlinear resistance;

changing the value of the nonlinear resistance as a function of a periodic equation, wherein a range of absolute values of connection weights between units is limited by the equation of motion, wherein said equation of motion is expressed as $$m\ddot{x} + f(\dot{x}, \omega t) = -\epsilon \nabla E(x)$$

in which the term of said nonlinear resistance is represented by $f(\dot{x}, \omega t) = \{d_0 \sin(\omega t) + d_1\}\dot{x} + d_2\dot{x}^2 \operatorname{sgn}(\dot{x});$ and successively positioning the robot in accordance with the selected stored pattern.

2. A method of processing signals within a neural network to successively position a robot from an initial position to a desired position by determining an optimum path for the robot between the initial position and the desired position, comprising the steps of:

receiving a data representative of the initial position of the robot, the desired position of the robot and undesired path coordinates; repetitively calculating, within the neural network, successive coordinates of the optimum path of the robot based upon the actual motion of the robot, the data representative of the initial position of the robot, the desired position of the robot, undesired path coordinates and an equation of motion, the equation of motion including a term of nonlinear resistance, the nonlinear resistance having a value which changes as a function of a periodic equation, wherein a range of absolute values of connection weights between units is limited by the equation of motion, wherein said equation of motion is expressed as $$m\ddot{x} + f(\dot{x}, \omega t) = -\epsilon \nabla E(x)$$

in which the term of said nonlinear resistance is represented by $$f(\dot{x}, \omega t) = \{d_0 \sin(\omega t) + d_1\}\dot{x} + d_2\dot{x}^2 \operatorname{sgn}(\dot{x}); \text{ and}$$

successively positioning the robot in accordance with the calculated successive coordinates.

3. A method of processing signals within a Hopfield neural network to successively position a robot from an initial position to a desired position by selecting an optimum path for the robot between the initial position and the desired position, comprising the steps of:

storing a plurality of patterns in the Hopfield neural network, the patterns representative of paths of the robot;

searching within the neural network for a stored pattern, the selected stored pattern representative of successive coordinates of the optimum path of the robot, the searching based upon data representative of the initial position of the robot, the desired position of the robot, undesired path coordinates and an equation of motion, the equation of motion including a term of nonlinear resistance, wherein said equation of motion is expressed as $$m\ddot{x} + f(\dot{x}, \omega t) = -\epsilon \nabla E(x)$$

in which the term of said nonlinear resistance is represented by $$f(\dot{x}, \omega t) = \{d_0 \sin(\omega t) + d_1\}\dot{x} + d_2\dot{x}^2 \operatorname{sgn}(\dot{x});$$

changing the value of the nonlinear resistance as a function of a periodic equation; and successively positioning the robot in accordance with the selected stored pattern.

4. A method of processing signals within a neural network to successively position a robot from an initial position to a desired position by determining an optimum path for the robot between the initial position and the desired position, comprising the steps of:

receiving a data representative of the initial position of the robot, the desired position of the robot and undesired path coordinates;

repetitively calculating within the neural network, successive coordinates of the optimum path of the robot based upon the actual motion of the robot, the data representative of the initial position of the robot, the desired position of the robot, undesired path coordinates and an equation of motion, the equation of motion including a term of nonlinear resistance, the nonlinear resistance having a value which changes as a function of a periodic equation, wherein said equation of motion is expressed as $$m\ddot{x} + f(\dot{x}, \omega t) = -\epsilon \nabla E(x)$$

in which the term of said nonlinear resistance is represented by $$f(\dot{x}, \omega t) = \{d_0 \sin(\omega t) + d_1\}\dot{x} + d_2\dot{x}^2 \operatorname{sgn}(\dot{x}); \text{ and}$$

successively positioning the robot in accordance with the calculated successive coordinates.

\* \* \* \* \*